United States Patent
Cho et al.

(10) Patent No.: US 8,565,210 B2
(45) Date of Patent: Oct. 22, 2013

(54) APPARATUS FOR TRANSMITTING A SIGNAL IN WIRELESS COMMUNICATION SYSTEM AND METHOD FOR SAME

(75) Inventors: Han Gyu Cho, Gyeonggi-do (KR); Jin Soo Choi, Gyeonggi-do (KR); Jong Young Han, Gyeonggi-do (KR); Jin Sam Kwak, Gyeonggi-do (KR); Wook Bong Lee, Gyeonggi-do (KR); Dong Cheol Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/664,380

(22) PCT Filed: Jul. 31, 2009

(86) PCT No.: PCT/KR2009/004303
§ 371 (c)(1),
(2), (4) Date: Dec. 11, 2009

(87) PCT Pub. No.: WO2010/024536
PCT Pub. Date: Mar. 4, 2010

(65) Prior Publication Data
US 2011/0194423 A1    Aug. 11, 2011

Related U.S. Application Data

(60) Provisional application No. 61/092,069, filed on Aug. 27, 2008, provisional application No. 61/156,885, filed on Mar. 3, 2009, provisional application No. 61/159,087, filed on Mar. 11, 2009, provisional application No. 61/163,057, filed on Mar. 25, 2009, provisional application No. 61/184,318, filed on Jun. 5, 2009, provisional application No. 61/222,065, filed on Jun. 30, 2009, provisional application No. 61/224,905, filed on Jul. 12, 2009.

(51) Int. Cl.
*H04J 1/00*    (2006.01)
*H04W 40/00*    (2009.01)

(52) U.S. Cl.
USPC ............................................ 370/343; 455/447

(58) Field of Classification Search
USPC ................. 370/329, 330, 343, 344, 468, 480; 455/445–447, 450–452.2
See application file for complete search history.

(56) References Cited

U.S. PATENT DOCUMENTS

| | | | |
|---|---|---|---|
| 7,251,492 B2 * | 7/2007 | Zhang | 455/447 |
| 8,005,432 B2 * | 8/2011 | Catreux-Erceg et al. | 455/67.11 |
| 8,068,459 B2 * | 11/2011 | Kravtsov et al. | 370/329 |
| 2009/0047971 A1 * | 2/2009 | Fu | 455/450 |
| 2009/0175192 A1 * | 7/2009 | Chuang et al. | 370/253 |
| 2010/0014500 A1 * | 1/2010 | Lee et al. | 370/342 |
| 2010/0105406 A1 * | 4/2010 | Luo et al. | 455/452.2 |
| 2011/0014909 A1 * | 1/2011 | Han et al. | 455/423 |
| 2011/0134759 A1 * | 6/2011 | Kim et al. | 370/242 |
| 2011/0143800 A1 * | 6/2011 | Han et al. | 455/509 |

* cited by examiner

FOREIGN PATENT DOCUMENTS

| | | |
|---|---|---|
| WO | 2006020032 | 2/2006 |
| WO | 2008053429 | 5/2008 |
| WO | 2008055132 | 5/2008 |

*Primary Examiner* — Kerri Rose
(74) *Attorney, Agent, or Firm* — Lee, Hong, Degerman, Kang & Waimey

(57) ABSTRACT

A method for transmitting signal, at a mobile station, in a wireless communication system is provided. Inter-cell interference level control parameter information may be different for each frequency partition due to use of an FFR scheme. This method is advantageous in that, when uplink transmission is performed, system throughput and cell edge-user throughput are improved and inter-cell interference level control is efficiently performed, thereby improving a Signal to Interference plus Noise Ratio (SINR) at the receiving end.

8 Claims, 10 Drawing Sheets

APPARATUS FOR TRANSMITTING A SIGNAL IN WIRELESS COMMUNICATION SYSTEM AND METHOD FOR SAME

CROSS-REFERENCE TO RELATED APPLICATIONS

This application is the National Stage filing under 35 U.S.C. 371 of international application No. PCT/KR2009/004303, filed on Jul. 31, 2009, which claims the benefit of U.S. provisional application Nos. 61/092,069, filed on Aug. 27, 2008, 61/156,885, filed on Mar. 3, 2009, 61/159,087, filed on Mar. 11, 2009, 61/163,057, filed on Mar. 25, 2009, 61/184,318, filed on Jun. 5, 2009, 61/222,065, filed Jun. 30, 2009, and 61/224,905, filed on Jul. 12, 2009, the contents of which are all hereby incorporated by reference herein in their entirety.

TECHNICAL FIELD

The present invention relates to a wireless communication system, and more particularly, to an MS apparatus and method for transmitting signals using an FFR scheme.

BACKGROUND ART

In a Orthogonal Frequency Division Multiple Access (OFDMA) system of multi-carrier scheme, resources are allocated in units of subchannels, each including subcarriers. A plurality of users separately share all subcarriers, so multi-user diversity gain is obtained in frequency region. In an OFDMA broadband mobile Internet access system such as WiBro, all cells reuse the same frequency and an Adaptive Modulation & Coding (AMC) scheme is applied according to received signal strength and interference between neighbor cells due to reuse of the same frequency, thereby maximizing throughput.

However, in such a system having a Frequency reuse Factor (FRF) of 1, inter-cell interference is severe and throughput reduction is inevitable at edges (i.e., boundaries) of cells or sectors. This may cause service outage. In a method for improving performance at cell edges when a frequency reuse factor of 1 is used, all subcarriers are orthogonally divided into a number of frequency partitions and the frequency partitions are appropriately arranged in cells such that a specific frequency partition is not used or is used at low power in each cell, thereby reducing interference of the same channel between neighbor cells. This method is referred to as a Fractional Frequency Reuse (FFR) scheme.

In order to apply FFR to an actual system, a band to be used in each cell may be determined based on frequency partitions arranged in the cell according to location information of each Mobile Station (MS). In actual situations, a signal to interference ratio may be dynamically reflected in determining which frequency partitions are to be used for each cell among a band allocated to the cell since the signal to interference ratio constantly varies in the same band due to movement of the MS, fading, etc.

In order to dynamically use resources taking into consideration the signal to interference ratio or the like when partial frequency partitions have been allocated to each cell as described above, it is necessary to take into consideration fairness between users in addition to the given Frequency Reuse Factor (FRF).

When all subcarriers are orthogonally divided into a number of frequency partitions in the OFDMA system as described above, various types of FFR schemes may be taken into consideration to allow cells to share these frequency partitions. The following is a description of the concept and characteristics of such FFR schemes.

As the FRF approaches 1, inter-cell interference due to use of the same channel at cell edges may increase, thereby reducing communication performance, although the size of a band that is available in the cell increases. On the other hand, as the FRF increases, the size of the available band decreases, thereby reducing band efficiency, although inter-cell interference due to use of the same channel decreases.

FIG. 1 illustrates an example FFR scheme.

Referring to FIG. 1, FFR is a method for increasing cell capacity and user Quality of Service (QoS). In the FFR scheme, services are provided to users located near a Base Station (BS) using a frequency reuse factor (FRF) of 1 (i.e., using all subcarriers) to maximize total cell capacity since the level of inter-cell interference will be relatively low for users located near the BS from the viewpoint of the entire cell. In the case where the FRF 1 is used, a FRF of 3 is used for cell-edge users expected to undergo a high inter-cell interference level (i.e., not all subcarriers are used but instead part of the bands of FRF 3 is used for each sector), thereby reducing inter-cell interference to provide high quality services.

FFR is classified into hard FFR in which frequency bands used by cell-edge users of other cells are not used and soft FFR in which such frequency bands are also used with restriction of power and specific conditions.

The soft FFR scheme is a general concept including hard FFR. In the soft FFR scheme, neighbor cells set different transmission power levels for each frequency partition, thereby increasing overall cell capacity. Here, the soft FFR scheme becomes a hard FFR scheme if transmission power is set to 0.

FIG. 2 illustrates example hard and soft FFR schemes.

Referring to FIG. 2, in the case of the hard FFR scheme, only specific frequency bands are used among frequency bands of FFR 1/3 in each cell. On the other hand, it can be seen that, in the case of the soft FFR scheme, all frequency bands of FFR 1/3 are at different power levels in each cell. For example, the power level of the same frequency band of FFR 1/3 may be different for each cell. In addition, each cell may have different power levels for the frequency bands of FFR 1/3.

When the FFR scheme is applied, each frequency band generally has a different power level as shown in FIG. 2. The present invention suggests how to set a power level for each FFR group or each frequency partition and how to perform signaling in downlink and uplink.

DISCLOSURE

Technical Problem

An object of the present invention is to provide a method for transmitting signals in a wireless communication system. Another object of the present invention is to provide an MS apparatus for transmitting signals in a wireless communication system.

Objects of the present invention are not limited to those described above and other objects will be clearly understood by those skilled in the art from the following description.

Technical Solution

A method for transmitting, at a mobile station, signals in a wireless communication system to achieve the objects of the present invention includes receiving information a specific frequency partition allocated to the mobile station according to a fractional frequency reuse scheme, receiving parameter information for controlling an inter-cell interference level for each frequency partition from a base station, determining a transmission power level for the allocated specific frequency partition using the received information, and transmitting a signal to the base station at the determined transmission power level.

The method may further include receiving, from the base station, at least one of a minimum required Signal to Interference plus Noise Ratio (SINR), a factor value according to the number of receive antennas of the base station, and a value indicating a MAC power control mode.

The inter-cell interference control parameter includes default inter-cell interference control parameter information representing a default value of each frequency partition and relative adjustment inter-cell control parameter information representing a relative difference value from the default cell interference control parameter value of a specific frequency partition.

A frequency partition which uses the default inter-cell interference control parameter alone may be determined according to a number of predefined frequency partitions.

When the number of predefined frequency partitions is 1, the frequency partition which uses the default inter-cell interference control parameter alone may correspond to a frequency partition of a frequency reuse factor of 1.

When the number of predefined frequency partitions is 3, the frequency partition which uses the default inter-cell interference control parameter alone may correspond to a specific frequency partition among frequency partitions of the frequency reuse factor of 3.

On the other hand, a specific frequency partition among frequency partitions of a frequency reuse factor of 3 may be different for each cell.

The default inter-cell interference control parameter value is equal for all frequency partitions or for a specific frequency partition group among the all frequency partitions or may be different for each frequency partition.

The default inter-cell interference control parameter value may be signaled in 4 bits from the base station.

The base station may notify the mobile station of the specific frequency partition among the frequency partitions of a frequency reuse factor of 3 is notified through broadcast signaling, or individual signaling of each mobile station.

The specific frequency partition among the frequency partitions of a frequency reuse factor of 3 may be determined as a cell Identifier (ID) function.

The relative adjustment inter-cell interference control parameter value may be used for a specific frequency partition among frequency partitions of a frequency reuse factor of 3.

The relative adjustment inter-cell interference control parameter value may be signaled in 2 or 3 bits from the base station.

The step of determining the transmission power level may include determining transmission power additionally taking into consideration a downlink signal to interference plus noise power ratio (SINR) measured at the mobile station.

The determined transmission power level may be a transmission power level determined for each stream and for each subcarrier.

The inter-cell interference control parameter may be determined through coordination between the base stations. The inter-cell interference control parameter may also be signaled to the mobile station through a control channel or message, wherein the control channel may be one of a superframe header, an uplink Advanced-MAP Information Element (A-MAP IE), and Additional Broadcast Information (ABI).

Advantageous Effects

According to the present invention, when uplink transmission is performed, it is possible to improve system throughput and cell edge-user throughput and to efficiently perform inter-cell interference level control.

Advantages of the present invention are not limited to those described above and other advantages will be clearly understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Figure 1:
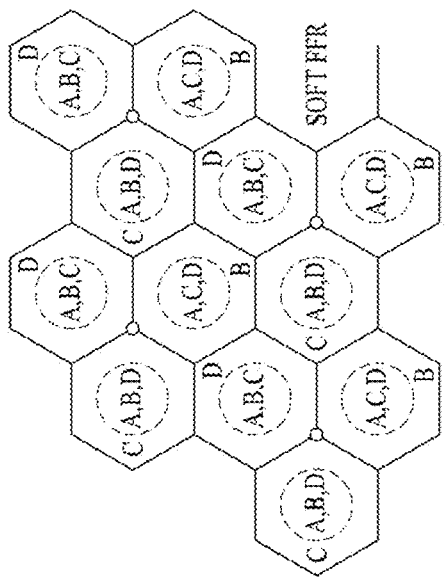
FIG. 1 illustrates an example FFR scheme.
Figure 1:
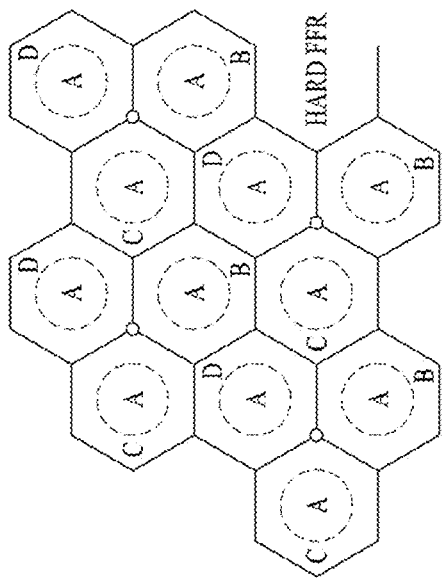
Figure 2:
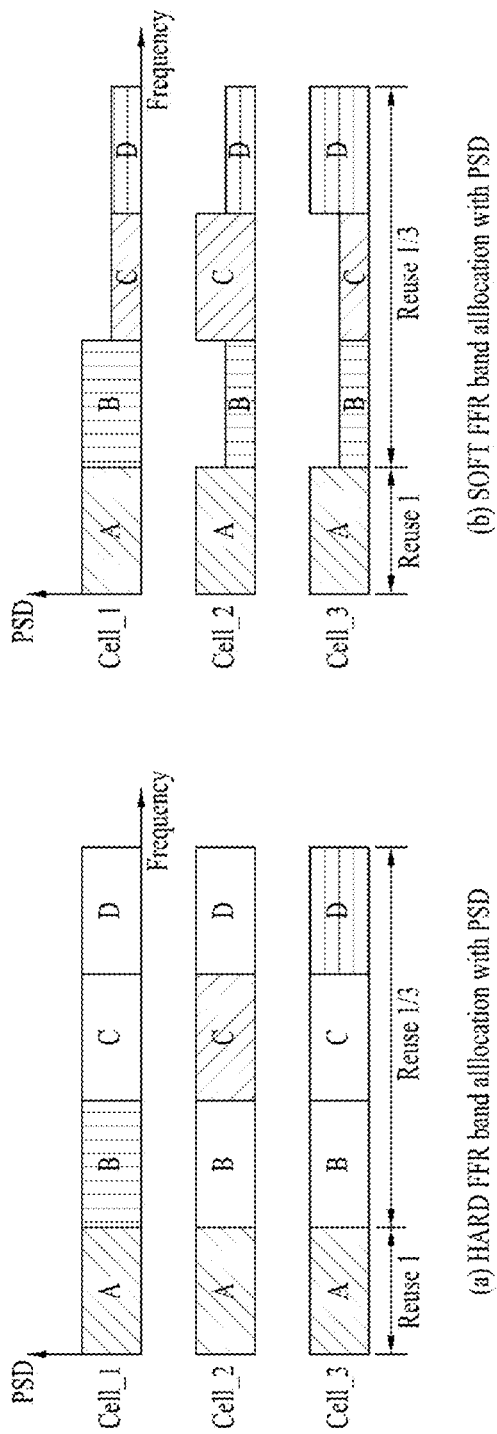
FIG. 2 illustrates example hard and soft FFR schemes.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following description will be given with reference to specific terms, the present invention is not necessarily limited to the specific terms and other terms may also be used to indicate the same meanings. The same reference numbers will be used throughout this specification to refer to the same or like parts.

The expression "a portion includes a specific component" used throughout this specification indicates that the portion may also include other components, rather than includes the specific component alone, unless explicitly stated otherwise.

Technologies described below can be used in a variety of communication systems, which can provide a variety of communication services such as voice and packet data services. Communication system technologies can be used in downlink or uplink. The term "Base Station (BS)" may be replaced with another term such as "fixed station", "Node B", "eNode B (eNB)", "access point", or "ABS". The term "Mobile Station (MS)" may also be replaced with another term such as "User Equipment (UE)", "Subscriber Station (SS)", "Mobile Subscriber Station (MSS)", "AMS", or "mobile terminal".

The term "transmitting end" refers to a node that transmits data or audio services and "receiving end" refers to a node that receives data or audio services. Thus, in uplink, the MS may be a transmitting end and the BS may be a receiving end. Similarly, the MS may be a receiving end and the BS may be a transmitting end in downlink.

A Personal Digital Assistant (PDA), a cellular phone, a Personal Communication Service (PCS) phone, a Global System for Mobile (GSM) phone, a Wideband CDMA (WCDMA) phone, or a Mobile Broadband System (MBS) phone may be used as the MS in the present invention.

The embodiments of the present invention can be supported by standard documents of at least one of the Institute of Electrical and Electronics Engineers (IEEE) 802 system, the 3GPP system, the 3rd Generation Partnership Project Long Term Evolution (3GPP LTE) system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents. Especially, the embodiments of the present invention can be supported by P802.16-2004, P802.16e-2005, P802.16Rev2, and P802.16m AWD or P802.16m draft, which are standard documents of the IEEE 802.16 system.

Specific terms used in the following description are provided for better understanding of the present invention and can be replaced with other terms without departing from the spirit of the present invention.

The term "Base Station (BS)" used in the present invention conceptually includes "cell" or "sector", and can also be referred to as a cell or sector.

The present invention suggests how to set a power level for each FFR group or each frequency partition and how to perform signaling in downlink and uplink.

In addition, this specification describes a power control method for improving performance of cell-edge user and performance of cell or sector system using a Fractional Frequency Reuse (FFR) scheme in uplink. An object of this power control method is to reduce interference and to achieve minimum cell-edge user performance. Another object of this power control method is to improve performance in multi-user MIMO environments while maintaining the same level of interference as in the single-user scheme. One main feature of this power control method is to minimize control signaling in order to reduce overhead while achieving the same performance.

A system that uses the FFR scheme can use at least two frequency partitions. When two or more frequency partitions are present, the frequency partitions may undergo different communication environments such as different channel characteristics, different interference characteristics. This can be used for specific purposes. That is, when a Mobile Station (MS) is in a bad channel condition, the MS can achieve an improvement in performance by using resources of frequency and time regions in which a relatively low level of interference is measured.

Figure 3:
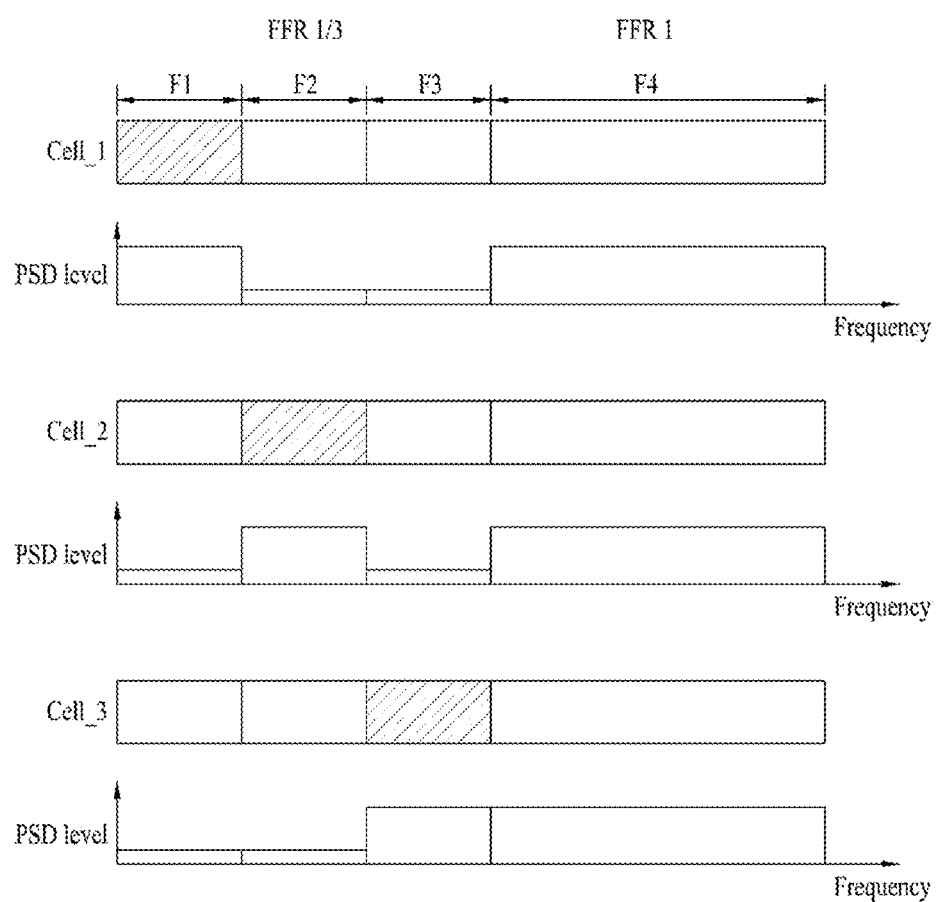
FIG. 3 illustrates an example FFR scheme.

FIG. 3 illustrates an example FFR scheme.

Referring to FIG. 3, four frequency partitions may be present and relatively large power may be used in a specific one of the three FFR 1/3 regions if the soft FFR scheme is used. It is preferable that the FFR 1/3 region be used for a specific MS which is in a bad channel condition. It is necessary to take into consideration the amount of interference caused to other cells or sectors when performing power and user allocation to the remaining two FFR 1/3 regions. This is because the benefits of the FFR scheme may not be achieved in the case where the resource allocation of the regions is not appropriate. In the present invention, it is possible to apply an algorithm suitable for each frequency partition in order to support a system, to which the FFR scheme is applied, to efficiently support such allocation. This algorithm may operate based on an open-loop power control scheme.

Since propagation loss, interference, noise, and the like may operate as factors reducing signal quality, to obtain signal quality required for the receiving end, it is necessary to appropriately control transmission power so as to overcome such signal quality reduction factors.

Power control generally satisfies the signal quality required for the receiving end by compensating for pathloss (or propagation loss), interference, and noise between the BS and the MS. Accordingly, transmission power may be determined taking into consideration a target Signal to Interference plus Noise Ratio (SINR), noise (N), interference (I), and pathloss (PL) or may be determined taking into consideration a target Carrier to Interference plus Noise Ratio (CINR), noise (N), interference (I), and pathloss (PL) as expressed in the following Mathematical Expression 1.

$$P_{tx} = f(SINR_{target}, N, I, PL) \text{ or}$$
$$f(CINR_{target}, N, I, PL) \quad \text{[Mathematical Expression 1]}$$

Mobile communication system may have pathloss according to distance since electromagnetic waves are used as a transmission means. Such pathloss may be caused by attenuation that electromagnetic or radio waves undergo until arriving at a receive antenna after being transmitted from a transmit antenna, and may also be caused by changes in the distance between the transmitting and receiving ends due to the movement of the moving body or ambient environments.

Uplink power control in the IEEE 802.16e system is briefly described as follows. In the IEEE 802.16e system, system performance can be improved by performing power control taking into consideration not only the SINR or CINR, pathloss, interference, and noise but also offsets due to the BS and the MS ($\Delta\text{offset\_MS}$ and $\Delta\text{offset\_BS}$) according to system characteristics. This can be represented by the following Mathematical Expression 2.

$$P_{tx} = SINR + (I+N) + PL + \Delta_{offset\_MS} + \Delta_{offset\_BS} [dBm] \quad \text{[Mathematical Expression 2]}$$

Since interference due to neighbor cell is factor deteriorating system performance, it is necessary to control transmission power so as to overcome interference through power control in wireless communication systems. Transmission power is generally proportional to interference power. That is, increasing the transmission power to overcome interference causes an increase of interference caused to neighbor cells, which then may cause the serving cell to receive stronger interference from the neighbor cells. Accordingly, there is a need to provide a power control method which appropriately controls interference caused to neighbor cells while ensuring signal quality required for the receiving end.

Fractional power control compensates only for part of pathloss using a power control method for suppressing inter-cell interference (ICI). That is, if transmission power is reduced by compensating only for part of pathloss, it is possible to reduce interference caused to neighbor cells, resulting in a reduction of interference received from neighbor cells. Such power control may be represented by the following Mathematical Expression 3.

$P_{tx}=SINR+(I+N)+\alpha \cdot PL[dBm], 0<\alpha \leq 1$     [Mathematical Expression 3]

Here, $\alpha$ is a factor to compensate for part of pathloss.

The following is a description of a power control method to achieve a target interference level.

A target interference level may be used as a method for minimizing interference caused to neighbor cells while satisfying signal quality required for the receiving end. The target interference level is a level of interference to satisfy required signal quality at a receiving end and may be expressed using a variety of terms including inter-cell interference terms (or elements) such as IoT, SINR, and CINR.

In the case inter-cell interference level in a cell or sector is greater than a level of required signal quality, the receiving end may request a neighbor cell or sector to restrict inter-cell interference and this request may be signaled through a backbone link. Power control may be performed through inter-cell coordination between BSs rather than through an individual request.

A BS of a cell or sector has received a request to perform power control for limiting or reducing inter-cell interference or a BS performs inter-cell coordination with other BSs, the BS may control transmission power of the transmitting end as expressed by the following Mathematical Expressions in order to reduce inter-cell interference caused to neighbor cells or sectors.

$P_{tx}=(1-\alpha)P_{IoT_{target}}+\alpha P_{intra\_tx}$ where, $0 \leq \alpha \leq 1$ if $\alpha=1, IoT_{tar} \geq IoT_e$ $\alpha=0, IoT_{tar} < IoT_e$     [Mathematical Expression 4]

$P_{tx}=\alpha P_{IoT_{target}}+(1-\alpha)P_{intra\_tx}$ where, $0 \leq \alpha \leq 1$ if $\alpha=1, IoT_{tar} < IoT_e$ $\alpha=0, IoT_{tar} \geq IoT_e$     [Mathematical Expression 5]

Here, $IoT_{tar}$ denotes a target level of inter-cell interference required from a neighbor cell or sector, $P_{intra\_tx}$ denotes transmission power when inter-cell interference is not taken into consideration, $IoT_e$ denotes an estimated level of interference caused to a neighbor cell or sector, and $P_{IoT_{target}}$ denotes a transmission power level for satisfying $IoT_{tar}$.

Here, 'N' may be omitted in the case where $IoT_{term}$ does not include noise unlike its original definition. $P_{intra\_tx}$ may be represented as $P_{intra\_tx}=SINR_{tar} \cdot PL_s \cdot (I+N)$ and may also be represented as $P_{intra\_tx}=SINR_{tar} \cdot PL_s \cdot (I+N) \cdot \Delta_{offset\_MS} \cdot \Delta_{offset\_BS}$ taking into consideration BS offset and MS offset. The inter-cell interference power $I_{inter}$ is received as $$I_{inter}=\frac{P_{tx\_intra}}{PL_t},$$

and $IoT_e$ is received as $$IoT_e=\frac{I_{inter}+N}{N} \approx \frac{I_{inter}}{N}=\frac{P_{tx\_intra}}{P_t} \cdot \frac{1}{N}.$$

If $N \gg 1$, $$IoT_{tar}=\frac{P_{IoT_{target}}}{PL_t} \cdot \frac{1}{N}$$

so that $P_{IoT_{target}}=IoT_{tar} \cdot PL_s \cdot N$.

In the case of Open Loop Power Control (OLPC) among power control methods for controlling inter-cell interference in which power control is performed by the MS, the BS may transmit, to the MS, an interference level ($IoT_{tar}$) for controlling inter-cell interference such as a target IoT received from a neighbor cell or sector (or a target IoT determined through coordination between BSs or a target IoT randomly determined between BSs).

In the case where a system bandwidth is divided into multiple frequency partitions as in the IEEE 802.16m system, a different interference level may be transmitted for each frequency partition or to each MS.

The interference level (target IoT, i.e., $IoT_{tar}$) for each frequency partition may be determined as in the following Mathematical Expression 6 or 7.

$IoT_{tar}=\omega \cdot IoT_{default}[dB]$     [Mathematical Expression 6]

$IoT_{tar}=\omega \pm IoT_{default}[dB]$     [Mathematical Expression 7]

In Mathematical Expression 6 or 7, $\omega$ denotes a weight factor for setting a target IoT and can be obtained using the following equation. The following is a description of various methods for setting the target IoT. In a first method, the target IoT can be represented by the following Mathematical Expression 8.

$IoT_{tar}=(1-\gamma)IoT_{min}+\gamma IoT_{default}$     [Mathematical Expression 8]

Here, a list that is signaled by the BS may include a minimum target IoT ($IoT_{min}$), a default target IoT ($IoT_{default}$) and an IoT adjustment value $\gamma$ ($0 \leq \gamma \leq 1$).

For example, when the number of frequency partitions is 4, $IoT_{default}=7$ dB, and $IoT_{min}=4$ dB, it may be possible that $IoT_{target\_FP0}=4$ dB, $IoT_{target\_FP1}=5$ dB, $IoT_{target\_FP2}=6$ dB, and $IoT_{target\_FP3}=7$ dB, and $\gamma_{FP0}=0, \gamma_{FP1}=1/3, \gamma_{FP2}=2/3$, and $\gamma_{FP3}=1$.

Here, the default target IoT is a reference value of the target IoT set for the each partitions in the case where multiple frequency partitions are present and may be the average of IoT values in all system bandwidth, the average of the target IoT values of the each frequency partition, or the like.

Here, the default target IoT value may be equal to the maximum target IoT value, the range of the target IoT value may be determined by the minimum IoT value, and the $IoT_{tar}$ value of each frequency partition may be determined by the value of $\gamma$. In order to reduce transmission overhead of the $\gamma$ value, the transmitting end and the receiving end can signal the $\gamma$ value using a table of the $\gamma$ value according to a bit sequence and the number of bits required for signaling the $\gamma$ value and the table can be appropriately changed according to the system characteristics. The following are examples of the table and the number of bits required for signaling the γ value.

$IoT_{tar}=(1-\gamma)IoT_{min}+\gamma IoT_{default}$ and $IoT_{min}$ can be signaled using 4 bits for each cell or sector, $IoT_{default}$ can be signaled using 4 bits for each cell or sector, and γ can be signaled using 2 bits for each frequency partition.

In the case where the number of frequency partitions is 4, $IoT_{default}$ can be signaled as "$IoT_{default}=0111$" if $IoT_{default}=7$ dB and $IoT_{min}$ can be signaled as "$IoT_{min}=0100$" if $IoT_{default}=4$ dB. In addition, $\gamma_{FP0}, \gamma_{FP1}, \gamma_{FP2}$, and $\gamma_{FP3}$ can be signaled as "$\gamma_{FP0}=00$", "$\gamma_{FP1}=01$", "$\gamma_{FP2}=10$", and "$\gamma_{FP3}=11$" if $\gamma_{FP0}=0, \gamma_{FP1}=1/3, \gamma_{FP2}=2/3$, and $\gamma_{FP3}=1$, respectively. This can be represented by the following Table 1.

TABLE 1

| Bit | Value |
| --- | --- |
| 00 | 0 |
| 01 | 1/3 |
| 10 | 2/3 |
| 11 | 1 |

Unlike the first method, in a second method, γ and η may be used in order to set a target IoT for each frequency partition. That is, it is possible to set a target IoT for each frequency partition as a ratio with respect to the default target IoT value using γ and η in the case of the second method. This method can be represented by the following Mathematical Expression 9.

$$IoT_{tar} = \frac{\gamma}{\eta} IoT_{default} \quad \text{[Mathematical Expression 9]}$$

A list that is signaled by the BS may include a default target IoT ($IoT_{default}$), an IoT adjustment value γ, and an IoT adjustment value η where $0 \leq \gamma \leq 1$ and $0 \leq \eta \leq 1$.

For example, it may be possible that the number of frequency partitions is 4, $IoT_{default}=5$ dB, $IoT_{target\_FP0}=4$ dB, $IoT_{target\_FP1}=5$ dB, $IoT_{target\_FP2}=6$ dB, and $IoT_{target\_FP3}=7$ dB, $\gamma_{FP0}=0.4, \gamma_{FP1}=0.5, \gamma_{FP2}=0.6$, and $\gamma_{FP3}=0.7$, and $\eta_{FP0}=0.5, \eta_{FP1}=1, \eta_{FP2}=0.5$, and $\eta_{FP3}=0.5$.

Unlike the first method, the values γ and η may be mapped to appropriate values according to a bit sequence using a predefined table by transmitting and receiving ends in order to reduce signaling overhead. The same table can be used for mapping of γ and η values and the table and the number of bits required for signaling can be appropriately changed according to system characteristics. The number of bits required to set a target IoT value for each frequency partition using the γ and η values and the default IoT value can be represented by the following Table 2. Table 2 is a table for γ and η.

TABLE 2

| Bit | Value |
| --- | --- |
| 000 | 0.2 |
| 001 | 0.3 |
| 010 | 0.4 |
| 011 | 0.5 |
| 100 | 0.6 |
| 101 | 0.7 |
| 110 | 0.8 |
| 111 | 0.9 |

$$IoT_{tar} = \frac{\gamma}{\eta} IoT_{default}$$

and $IoT_{default}$ can be signaled using 4 bits for each cell or sector, and γ can be signaled using 3 bits for each frequency partition, and η can be signaled using 3 bits for each frequency partition.

In the case where the number of frequency partitions is 4, $IoT_{default}$ can be signaled as "$IoT_{default}=0101$" if $IoT_{default}=5$ dB, and $\gamma_{FP0}=0.4, \gamma_{FP1}=0.5, \gamma_{FP2}=0.6$, and $\gamma_{FP3}=0.7$ can be signaled as "$\gamma_{FP0}=010$", "$\gamma_{FP1}=011$", "$\gamma_{FP2}=100$", and "$\gamma_{FP3}=101$", and $\eta_{FP0}=0.5, \eta_{FP1}=1, \eta_{FP2}=0.5$, and $\eta_{FP3}=0.5$ can be signaled as "$\eta_{FP0}=011$", "$\eta_{FP1}=011$", "$\eta_{FP2}=011$", and "$\eta_{FP3}=011$".

In the case of the second method, in order to reduce signaling overhead that may be caused when γ and η values are used to set the target IoT for each frequency partition, the γ value alone can be used as a scaling factor for the default IoT value, and the IoT of each partition can be adjusted as in the following example.

$$IoT_{tar} = \frac{\gamma}{(1-\gamma)} IoT_{default} \quad \text{[Mathematical Expression 10]}$$

A list that is signaled by the BS may include a default target IoT ($IoT_{default}$) and an IoT adjustment value γ ($0 \leq \gamma \leq 1$). $IoT_{tar}=IoT_{default}$ if γ=1.

For example, when the number of frequency partitions is 4, it may be possible that $IoT_{default}=5$ dB, $IoT_{target\_FP0}=4$ dB, $IoT_{target\_FP1}=5$ dB, $IoT_{target\_FP2}=6$ dB, and $IoT_{target\_FP3}=7$ dB, and $\gamma_{FP0}=4/9, \gamma_{FP1}=1, \gamma_{FP2}=6/11$, and $\gamma_{FP3}=7/12$.

Unlike the first and second methods, the value γ may be mapped to appropriate values according to a bit sequence using a table predefined by transmitting and receiving ends in order to reduce overhead due to signaling of the adjustment value of the IoT default value. The table and the number of bits required for signaling can be appropriately changed according to system characteristics.

In a fourth method, a scaling factor for a default IoT value is not used to set the target IoT value of each frequency partition and instead the target IoT value of each frequency partition may be set to a value obtained by increasing or decreasing the default IoT value. This method can be represented by the following Mathematical Expression 11.

$$IoT_{tar}=\gamma+IoT_{default} \quad \text{[Mathematical Expression 11]}$$

A list that is signaled by the BS may include a default target IoT $IoT_{default}$ (default target IoT=minimum target IoT) and an IoT adjustment value γ.

For example, when the number of frequency partitions is 4, it may be possible that $IoT_{default}=4$ dB, $IoT_{target\_FP0}=4$ dB, $IoT_{target\_FP1}=5$ dB, $IoT_{target\_FP2}=6$ dB, and $IoT_{target\_FP3}=7$ dB, and $\gamma_{FP0}=0, \gamma_{FP1}=1, \gamma_{FP2}=2$, and $\gamma_{FP3}=3$.

The following is an example of a method for setting an target IoT for each partition to a value obtained by increasing the default IoT and a method for signaling the target IoT. $IoT_{default}$ can be signaled using 4 bits for each cell or sector and γ can be signaled using 2 bits for each frequency partition. $IoT_{default}$ may be signaled as $IoT_{default}=0100$ and γ may be signaled as $\gamma_{FP0}0=000$ (0 dB), $\gamma_{FP1}=001$ (1 dB), $\gamma_{FP2}=010$ (2 dB), and $\gamma_{FP3}=011$ (3 dB).

In a fifth method, a target IoT value of each partition may be directly signaled as follows without using the default IoT value of each partition.

In the case where $IoT_{default}$=4 dB, $IoT_{target\_FP0}$=4 dB, $IoT_{target\_FP1}$=5 dB, $IoT_{target\_FP2}$=6 dB, and $IoT_{target\_FP3}$=7 dB when the number of frequency partitions is 4, they may be represented as $IoT_{target\_FP0}$=0100 (4 dB), $IoT_{target\_FP1}$=0101 (5 dB), $IoT_{target\_FP2}$=0110 (6 dB), and $IoT_{target\_FP3}$=0111 (7 dB).

In a sixth method, an target IoT value can be set by using the γ value as a weight factor of the default IoT value for adjusting the target IoT value, this can be represented by the following Mathematical Expression 12.

$$IoT_{tar} = \gamma \cdot IoT_{default} \quad \text{[Mathematical Expression 12]}$$

Here, a list that is signaled by the BS may include a default target IoT ($IoT_{default}$) and an IoT adjustment value γ.

In the case where the number of frequency partitions is 4, it may be possible that $IoT_{default}$=10 dB, $IoT_{target\_FP0}$=9 dB, $IoT_{target\_FP1}$=10 dB, $IoT_{target\_FP2}$=11 dB, and $IoT_{target\_FP3}$=12 dB, and $\gamma_{FP0}$=0.9, $\gamma_{FP1}$=1, $\gamma_{FP2}$=1.1, and $\gamma_{FP3}$=1.2.

The number of bits required for the default IoT value and the target IoT value and the table for mapping as represented in the following Table 3 can be appropriately changed according to system characteristics. This can be represented by the following Table 3.

TABLE 3

| bit | Value |
|---|---|
| 0000 | 0.0 |
| 0001 | 0.1 |
| 0010 | 0.2 |
| 0011 | 0.3 |
| 0100 | 0.4 |
| 0101 | 0.5 |
| 0110 | 0.6 |
| 0111 | 0.7 |
| 1000 | 0.8 |
| 1001 | 0.9 |
| 1010 | 1.0 |
| 1011 | 1.1 |
| 1100 | 1.2 |
| 1101 | 1.3 |
| 1110 | 1.4 |
| 1111 | 1.5 |

In Table 3, $IoT_{default}$ can be signaled using 4 bits for each cell or sector and γ can be signaled using 4 bits for each frequency partition. In the case where the number of frequency partitions is 4, $IoT_{default}$ can be signaled as $IoT_{default}$=1010 if $IoT_{default}$=10 dB, and $\gamma_{FP0}$=0.9, $\gamma_{FP1}$=1, $\gamma_{FP2}$=1.1, and $\gamma_{FP3}$=1.2 can be signaled as $\gamma_{FP0}$=1001, $\gamma_{FP1}$=1001, $\gamma_{FP2}$=1010, and $\gamma_{FP3}$=1100, respectively.

The main concept of open-loop power control is to set transmission power of the MS. More specifically, transmission power that can achieve a target SINR is set based on a Modulation and Code Scheme (MCS) indicated by a control channel (for example, an Advanced-MAP Information Element (A-MAP IE)). Here, the A-MAP IE is briefly described as follows. Control channels may include a broadcast channel and an A-MAP IE. The BS may transmit MCS level information or the like through an A-MAP IE among control channels. The BS may also transmit resource allocation information, power control information, or the like using an A-MAP IE. In many cases, an A-MAP IE is transmitted being coded more strongly than a MAC message.

In order to include new features suitable for the IEEE 802.16m system, open-loop power control suggested in the present invention may control uplink transmission power according to the number of streams to support uplink Collaborative Spatial Multiplexing (CSM) or single user spatial multiplexing. According to this modification, the total amount of interference to a neighbor cell can be fixed regardless of the number of streams used. Open-loop power control according to the present invention can control transmission power of an MS so that the estimated IoT level does not exceed the target value. In addition, the suggested IoT control can be efficiently combined with the FFR scheme.

The following Mathematical Expression 13 is an example of an open-loop power control formula suggested in the present invention.

$$P_{Tx} = \min(P_{Tx,1}, P_{Tx,2})[\text{dBm}] \quad \text{[Mathematical Expression 13]}$$

Here, $P_{Tx,1}$=$PL_s$+NI+$SINR_{Target}$+$Offset_{perAMS}$+$Offset_{perABS}$ [dBm] and $P_{Tx,2}$=TargetIoT+$N_0$+$PL_i$ [dBm], $P_{Tx,2}$=TargetIoT+$N_0$+SIR+$PL_s$[dBm], $P_{Tx,2}$=TargetIoT+$N_0$+SINR+$PL_s$ [dBm] $P_{Tx,2}$=NI+SIR+$PL_s$ [dBm], $P_{Tx,2}$=TargetIoT+NI+$PL_s$+SINR, or $P_{Tx,2}$=TargetIoT+$N_0$-10 log 10($P_{RX}$/$P_{Tx}^{DL}$-10$^{-PL_s/10}$)[dBm]. In all of these cases, the target IoT can be replaced with an arbitrary controlling parameter that is signaled to the MS in order to control inter-cell interference (or IoT). A different value may be signaled in each frequency partition (or band).

Here, $PL_s$ denotes pathloss for a serving BS, $PL_i$ denotes pathloss for a BS with the strongest interference, $P_{Rx}$ denotes total reception power, $P_{Tx}^{DL}$ denotes transmission power of the BS, NI denotes a noise and interference level of the serving cell that is updated every 100 ms, $N_0$ denotes noise power density, $SINR_{Target}$ may mean a function of an MCS and a target Block Error Rate (BLER) (i.e., $SINR_{Target}$=f (MCS, targetBLER)), and $Offset_{perAMS}$ may denotes a correction term for a specific-MS power offset. $Offset_{perABS}$ may be a transmission power level adjustment value controlled by the MS. The MS can perform mode switching between open-loop power control and closed-loop power control using a power control message through a UL A-MAP.

The above Mathematical Expression 13 can be changed to the following Mathematical Expression 14 or 15.

$$P_{Tx} = \min(P_{Tx,1}, P_{Tx,2}) - 10 \log 10(MT_T)[\text{dBm}] \quad \text{[Mathematical Expression 14]}$$

$$P_{Tx} = \min(P_{Tx,1}, P_{Tx,2} - 10 \log 10(MT_T))[\text{dBm}] \quad \text{[Mathematical Expression 15]}$$

Here, $P_{Tx}$ denotes transmission power of each stream and each subcarrier and $MT_T$ denotes the total number of streams for a corresponding resource unit indicated by a UL A-MAP IE. $P_{Tx}$+10 log(10*(the total number of subcarriers in the frequency domain for each OFDMA symbol)) cannot exceed the maximum transmission power of the MS. The BS can transmit TargetIoT to the MS through a control channel or using message type. Here, TargetIoT may be signaled to an MS through a superframe header (for example, a Secondary Superframe Header (S-SFH) or Additional Broadcast Information (ABI)) in the control channel and may also be signaled to a specific MS through a unicast or the like. The MS may perform power control so that interference to another sector does not exceed the signaled TargetIoT. Here, TargetIoT may differ in each frequency partition. In the case of a Single-Input Multi-Output (SIMO) simulation, $MT_T$ can be set to "1".

An example procedure in which a BS determines a TargetIoT level is described as follows.

Each BS may calculate $IoT_{avg}$ and the network may calculate a mean IoT value by averaging the $IoT_{avg}$ levels of BSs. The network then compares the averaged mean IoT with a desired IoT level. Here, the desired IoT level is a common mean IoT level that the network desires all BSs to have. TargetIoT is reduced if the averaged mean IoT value is greater than the desired IoT level and is increased if the mean IoT value is less than the desired IoT level. Thereafter, the BS can signal the updated TargetIoT level. This procedure may be periodically repeated.

Another example procedure for determining the TargetIoT level is described as follows. BSs exchange desired IoT levels. Here, each BS may desire a different IoT level. Thereafter, each BS calculates TargetIoT taking into consideration a desired IoT level received from another BS. Then, the BS broadcasts the updated TargetIoT level. This procedure may be periodically repeated.

The following Mathematical Expression 16 represents uplink open-loop power control of the IEEE 802.16e system.

$$P_{tx}=PL+NI+SINR_{target}+Offset_{perAMS}+Offset_{perABS} \quad \text{[Mathematical Expression 16]}$$

A method for improving system performance, controlling inter-cell interference, and improving cell-edge user performance based on this equation can be implemented in a unified algorithm form. The suggested method described below is based on single stream transmission. One method for extending the single stream to multiple streams is to add '$-10\log_{10}(MT_T)$' to a finally determined value or an appropriate intermediate value. This serves to reduce the amount of interference in a multiple user environment having multiple streams with the same resource to an interference level of a single user environment having a single stream with one resource, thereby improving performance. This may operate based on a minimum amount of control information.

Power that is to be transmitted by an MS taking into consideration inter-cell interference and cell-edge users in the first method among the uplink open-loop power control methods can be represented by the following Mathematical Expressions 17.

$$P_{tx}=PL_1+NI+(SINR_{target},\max(SINR_{min},\\ \min(SINR_{target},\Delta IoT_{max}+N_0+SIR_{DL})))+\\ Offset_{perAMS}+offset_{perABS}-\\ 10\log_{10}(MT_T) \quad \text{[Mathematical Expression 17]}$$

$$P_{tx}=PL_s+NI+(SINR_{target},\max(SINR_{min},\\ \min(SINR_{target},\Delta IoT_{max}+N_0+SIR_{DL}-10\log_{10}\\ (MT_T))))+Offset_{perAMS}+\\ Offset_{perABS} \quad \text{[Mathematical Expression 18]}$$

$$P_{tx}=PL_s+NI+(SINR_{target},\max(SINR_{min},\\ \min(SINR_{target},\Delta IoT_{max}+N_0+SIR_{DL})+\\ Offset_{perAMS}+Offset_{perABS}))-\\ 10\log_{10}(M_T) \quad \text{[Mathematical Expression 19]}$$

$$P_{tx}=PL_s+NI+(SINR_{target},\max(SINR_{min},\\ \min(SINR_{target},\Delta IoT_{max}N_0+SIR_{DL}-\\ 10\log_{10}(MT_T))+Offset_{perAMS}+\\ Offset_{perABS}) \quad \text{[Mathematical Expression 20]}$$

$$\Delta IoT_{max}=IoT_{max}-NI \quad \text{[Mathematical Expression 21]}$$

In the first method, a parameter which serves as an SINR target value has two options. Initially, the BS may determine a transmission control mode of the MS or the MS may request a specific mode from the BS as represented by ($SINR_{target}, \max(SINR_{min}, \min(SINR_{target}, \Delta IoT_{max}+N_0+SIR_{DL}))$). The step of determining the initial target value if it is not an SINR target value is represented by $\max(SINR_{min}, \min(SINR_{target}, \Delta IoT_{max}+N_0+SIR_{DL}))$.

In Mathematical Expression 18, transmission power is determined through 2 steps in a method of determining a Power Spectral Density (PSD) level. Mathematical Expressions 17, 18, and 19 may be classified according to the positions of two parameters that are identified as offsets. Mathematical Expressions 18 and 19 may be classified according to the position of $MT_T$. Mathematical Expressions 20 and 21 may also be classified using the same concept. Here, a multi-stream part is used as an element for determining transmission power. In addition to, the following is a description of a method that can be applied to the above Mathematical Expressions when the FFR scheme is taken into consideration.

The SINR_target value which is commonly applied to Mathematical Expressions 17 to 20 may be equal or different for each frequency partition.

Figure 4:
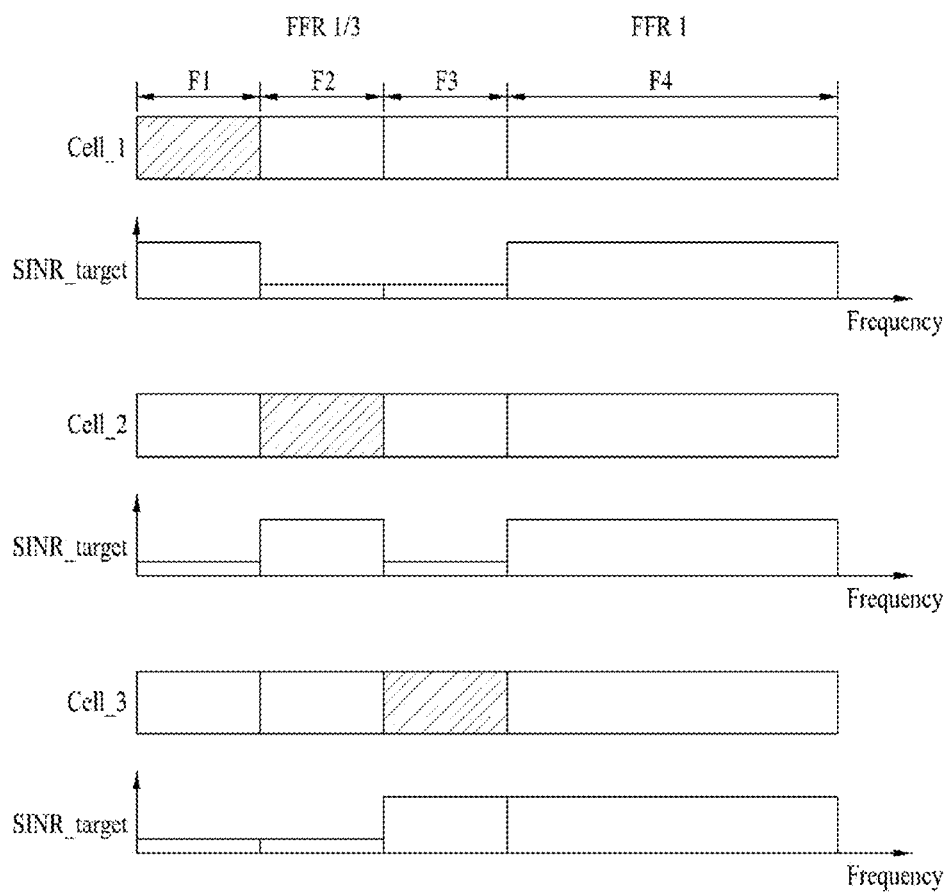
FIG. 4 illustrates an example wherein a different SINR_target value is applied in each frequency partition when the FFR scheme is applied.

FIG. 4 illustrates an example wherein a different SINR_target value is applied in each frequency partition when the FFR scheme is applied.

Referring to FIG. 4, regions F1 and F4 in cell 1 have the same SINR_target level and regions F2 and F3 have relatively lower SINR_target levels than F1 and F4. However, the regions F2 and F3 may have the same SINR_target value or different SINR_target values. In a method for determining such values, they may be determined on a system-wide basis at the network level.

A variety of user identification methods or user allocation methods may be considered. These methods may be based on user geometry, pathloss, reception SINR, and the like. The basic principle of division of frequency partitions is that frequency partitions are divided in a coordinated fashion at the network level. Of course, the number of frequency partitions is not fixed to 4. Even if the number of frequency partitions is increased, different SINR_target values may be set and used for frequency partitions, which are allowed to be used to be suitable for purposes, as follows:

SINR_target_F1 and F4:10 dB

SINR_target_F2 and F3:8 dB.

In another example, different SINR_target values may be set for frequency partitions as follows:

SINR_target_F1:10 dB

SINR_target_F4:9 dB

SINR_target_F2 and F3:8 dB.

In another example, different SINR_target values may be set for frequency partitions as follows:

SINR_target_F1:10 dB

SINR_target_F4:9 dB

SINR_target_F2:8 dB

SINR_target_F2:7 dB.

As different SINR_target values may be set for frequency partitions, $SINR_{min}$ or $SIR_{min}$ values, which are commonly used in the above Mathematical Expressions 17 to 20, can also be set differently for frequency partitions. The same level of values may be used in frequency partitions or may be used as in the following examples. However, it is preferable that SINR_target values be set to be suitable for the situation of the system.

In an example, SINR_target values may be set for frequency partitions as follows:

SINR_min_F1,F2 and F3:0 dB

SINR_min_F4:−∞.

In another example, SINR_target values may be set for frequency partitions as follows:

SINR_min_F1:0 dB

SINR_min_F4:3 dB

SINR_min_F2 and F3:−1 dB.

In another example, SINR_target values may be set for frequency partitions as follows:

SINR_min_F1:0 dB

SINR_min_F4:3 dB or −∞

SINR_min_F2:−1 dB

SINR_min_F2:−2 dB.

Alternatively, the same value may be set for frequency partitions as follows: SINR_min_F1, F2, F3 and F4:0 dB. The value of $\Delta IoT_{max}$, which is commonly used in the above Mathematical Expressions 17 to 20, may also be set to be different for each frequency partition. For example, the values of $\Delta IoT_{max}$ of the frequency partitions F1 and F4 may be set to be relatively greater than those of the frequency partitions F2 and F3.

In the second method among the open-loop power control methods in which an MS controls transmission power, $SINR_{min}$ and $\Delta IoT_{max}+N_0+SIR_{DL}$ values are compared directly with each other and the greater of these two values is used in place of the $SINR_{target}$ value in the case of modes other than the mode in which the $SINR_{target}$ value is selected. Equations for obtaining transmission power based on the second method can be represented in a variety of forms as in Mathematical Expressions 22 to 25.

$P_{tx}=PL_s+NI+(SINR_{target},\max(SINR_{min},\Delta IoT_{max}+N_0+SIR_{DL}))+Offset_{perAMS}+Offset_{perABS}-10\log_{10}(MT_T)$ [Mathematical Expression 22]

$P_{tx}=PL_s+NI+(SINR_{target},\max(SINR_{min},\Delta IoT_{max}N_0+SIR_{DL})-10\log_{10}(MT_T))+Offset_{perAMS}+Offset_{ABS}$ [Mathematical Expression 23]

$P_{tx}=PL_s+NI+(SINR_{target},\max(SINR_{min},\Delta IoT_{max}+N_0+SIR_{DL})+Offset_{perAMS}+Offset_{perABS})-10\log_{10}(MT_T)$ [Mathematical Expression 24]

$P_{tx}=PL_s+NI+(SINR_{target},\max(SINR_{min},\Delta IoT_{max}+N_0+SIR_{DL}-10\log_{10}(MT_T))+Offset_{perAMS}+Offset_{perABS})$ [Mathematical Expression 25]

The equations based on the second method are divided into Mathematical Expressions 22 to 25 for the same reason as why the equations based on the first method are divided into Mathematical Expressions 17 to 20. Here, $SINR_{target}$, $\Delta IoT_{max}$, $SINR_{min}$, or $SIR_{min}$ values may each be set to be different for each frequency partition.

In a third method, $P_{min}$, $P_{tx1}$ and $P_{tx2}$ are compared with each other to determine $P_{tx}$. This can be represented by the following Mathematical Expressions 26 to 29.

$P_{tx}=\max[P_{min},\min(P_{tx1},P_{tx2})]$ [Mathematical Expression 26]

$P_{min}=SINR_{min}+NI+PL_s$ [Mathematical Expression 27]

$P_{tx1}=SINR_{tar}+NI+PL_s+\Delta offset_{MS}\Delta+offset_{BS}$ [Mathematical Expression 28]

$P_{tx2}=IoT_{max}+PL_s+N_0+SIR-10\log_{10}(MT_T)(MT_T=1)$ [Mathematical Expression 29]

Here, $P_{tx1}$ is equal to that of Mathematical Expression 16 and $P_{tx2}$ can be considered to play the same role as $\Delta IoT_{max}+N_0+SIR_{DL}$ Mathematical Expressions 17 to 20 when $MT_T=1$.

$PL_s$ denotes pathloss estimated by MS for the serving cell, $PL_i$ denotes pathloss estimated by MS for a cell with the strongest interference, NI denotes estimated an average power level of noise and interference of each subcarrier in the serving cell, and $SINR_{target}$ denotes an SINR level for transmitting a data or control channel. $SINR_{min}$ is the minimum SINR value given by the serving BS. $Offset_{perAMS}$ denotes a correction term for a specific-MS power offset. The MS can perform mode switching between open-loop power control and closed-loop power control using a power control message through a UL A-MAP. $Offset_{perABS}$ is a transmission power level adjustment value that is controlled by the MS. $MT_T$ denotes the total number of streams indicated by a UL A-MAP IE. In the case of single-user MIMO, the value of $MT_T$ is set to $M_t$, which is the number of streams of each user. In the case of CSM, the value of $MT_T$ is set to $M_{t\_A}$, which is the total number of streams. In the case of control channel transmission, the value of $MT_T$ may be set to 1. The BS may broadcast the target IoT level to another sector through an S-SFH. Here, the target IoT level may be different for each frequency partition.

A fourth method is described as follows. Both power of each subcarrier and power for each transmit antenna in open-loop power control are maintained by uplink transmission represented by the following Mathematical Expression 30.

$P(dBm)=L+SINR_{Target}+NI+OffsetAMS_{perAMS}+OffsetABS_{perAMS}$ [Mathematical Expression 30]

Here, $SINR_{target}$ is a target uplink SINR value received from a BS. A mode that is used to calculate this value may be signaled through a power control message. P is a transmission power level (dBm) per subcarrier for current transmission and L is an estimated average current uplink propagation loss. L may include a transmit antenna gain and pathloss of the MS. NI is an average power level of noise and interference per subcarrier estimated in the BS and does not include a receive antenna gain of the BS. $OffsetAMS_{perAMS}$ is a correction term for a specific-MS power offset and is controlled by the BS. $OffsetABS_{perABS}$ is a correction term for a specific-MS power offset and is controlled by the BS. The estimated average current uplink propagation loss L can be calculated based on total power received in an active subcarrier of a preamble.

When a user connects to the network, it is possible to perform negotiation of parameters using the following Mathematical Expression 31.

[Mathematical Expression 31]

$$SINR_{Target} = \begin{cases} SINR_{OPT}, & \text{OLPC Mode 1} \\ (C/N - 10\log10(R)), & \text{OLPC Mode 2} \end{cases}$$

Here, C/N is a normalized C/N of the modulation/FEC rate of the current transmission. This value is a parameter associated with an MCS level. R is the number of repetitions for the modulation/FEC rate. $SINR_{OPT}$ is a target SINR value for trade-off and IoT control between total system throughput and cell-edge performance and is determined by a control parameter γ or $\Delta_{IoT}$ and $SINR_{min}$. Here, a different symbol from γ or $\Delta_{IoT}$ may be used to represent the control parameter. $SINR_{OPT}$ can be represented by the following Mathematical Expression 32.

[Mathematical Expression 32]

$$SINR_{OPT} = 10\log10\left(\max\left(10^{\frac{SINR_{MIN}}{10}}, \gamma \cdot SIR_{DL} - \frac{1}{N_r}\right)\right), \text{ or}$$

$$\max(SINR_{MIN}, \min(C/N - 10\log10(R), \Delta_{IoT} + 10\log10(SIR_{DL}))).$$

Here, $SINR_{min}$ denotes the minimum required SINR expected by the BS and can be set by a unicast power control message. $SINR_{min}$ can be expressed using 4 bits in units of dB. $\Delta_{IoT}$ or $\gamma$ is a parameter for IoT control signaled by the BS and may have a different value for each frequency partition. $N_r$ denotes the number of receive antennas in the BS and $SIR_{DL}$ denotes the ratio of downlink signal power to interference power measured by the MS.

$$SINR_{OPT} = 10\log10\left(\max\left(10^{\frac{SINR_{MIN}}{10}}, \gamma \cdot SIR_{DL} - \frac{1}{N_r}\right)\right)$$

which is one option in Mathematical Expression 32, $SINR_{min}$ and $\gamma$ can be used for uplink open-loop power control. This method can improve the gain when the FFR scheme is applied. The value of $\gamma$ to be used can be selected from an appropriate range such as $\{0, 0.1, \ldots, 1.0, \ldots\}$ and it is possible to efficiently support the FFR scheme if different selected $\gamma$ values are applied to frequency partitions.

$\Delta IoT_{max}$, $SINR_{Target}$, $SINR_{min}$, $IoT_{max}$, NI, $MT_T$, $\gamma$ may be transmitted from a corresponding BS to MSs through a broadcast channel, a superframe header, ABI, a UL A-MAP IE or a message type. The amount of the transmitted information may vary according to the number of frequency partitions. The following are examples in which a BS broadcasts such information to MSs according to the frequency partition.

ΔIoTmax_FP0: xx dB or Table index

ΔIoTmax_FP1: xx dB or Table index

ΔIoTmax_FP2: xx dB or Table index

⋮

ΔIoTmax_FP_last: xx dB or Table index $SINR_{Target}$_FP0: xx dB or Table index $SINR_{Target}$_FP1: xx dB or Table index $SINR_{Target}$_FP2: xx dB or Table index

⋮

$SINR_{Target}$_FP_last: xx dB or Table index $SINR_{MIN}$_FP0: xx dB or Table index $SINR_{MIN}$_FP1: xx dB or Table index $SINR_{MIN}$_FP2: xx dB or Table index

⋮

$SINR_{MIN}$_FP_last: xx dB or Table index

NI_FP0: xx dB or Table index

NI_FP1: xx dB or Table index

NI_FP2: xx dB or Table index

⋮

NI_FP_last: xx dB or Table index

-continued

γ_FP0: xx dB or Table index

γ_FP1: xx dB or Table index

γ_FP2: xx dB or Table index

⋮

γ_FP_last: xx dB or Table index

Here, the transmission period of the above parameter values from the BS to the MS may be fixed or changed freely. Upon receiving the parameter values, the MS may determine transmission power based on the received parameter values. In one parameter notification method, the BS may notify the MS of each parameter value in a form such as a real value, a mapping value of a predefined table, or the like.

The following is a description of a detailed signaling method in which a BS signals information required for transmission power controlled by the MS.

Figure 5:
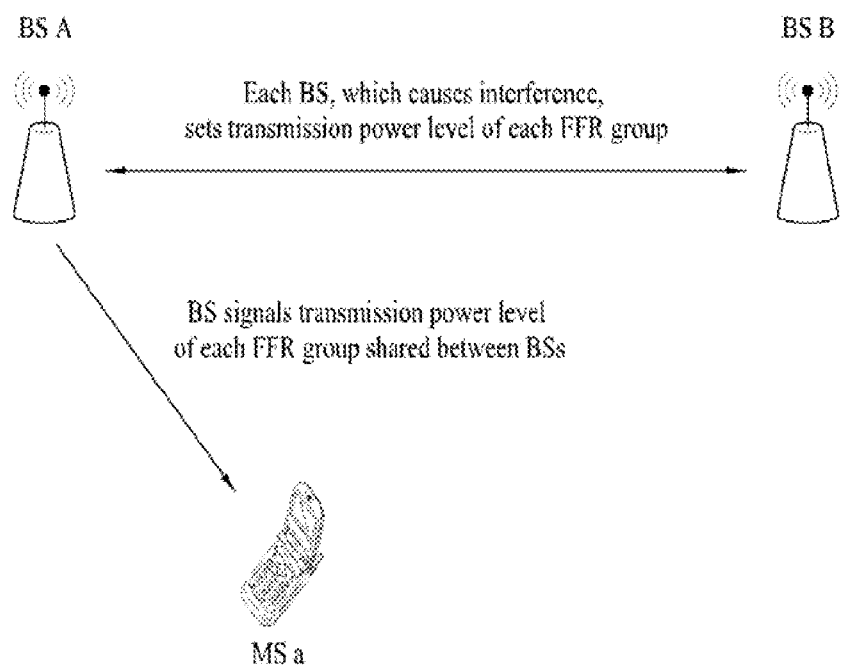
FIG. 5 illustrates the operation of a soft FFR scheme in downlink.

FIG. 5 illustrates the operation of a soft FFR scheme in downlink.

Referring to FIG. 5, in downlink, a BS may cause interference while an MS may be influenced by interference. The BS, which causes interference in downlink, may set a transmission power level for each FFR group (or partition). One BS may signal information of the transmission power level set for each FFR partition to another BS using a backbone network or the like. BSs may share the information of the transmission power level set for each FFR partition. Each BS may signal the information of the transmission power level set for each FFR partition to the MS. In the IEEE 802.16m system, such transmission power level set information may be periodically broadcast in units of a superframe or multiple superframes to each MS. Such information may also be implicitly transmitted through a reference signal (for example, a preamble). This may indicate that the reference signal is transmitted as the transmission power level for each FFR partition.

Figure 6:
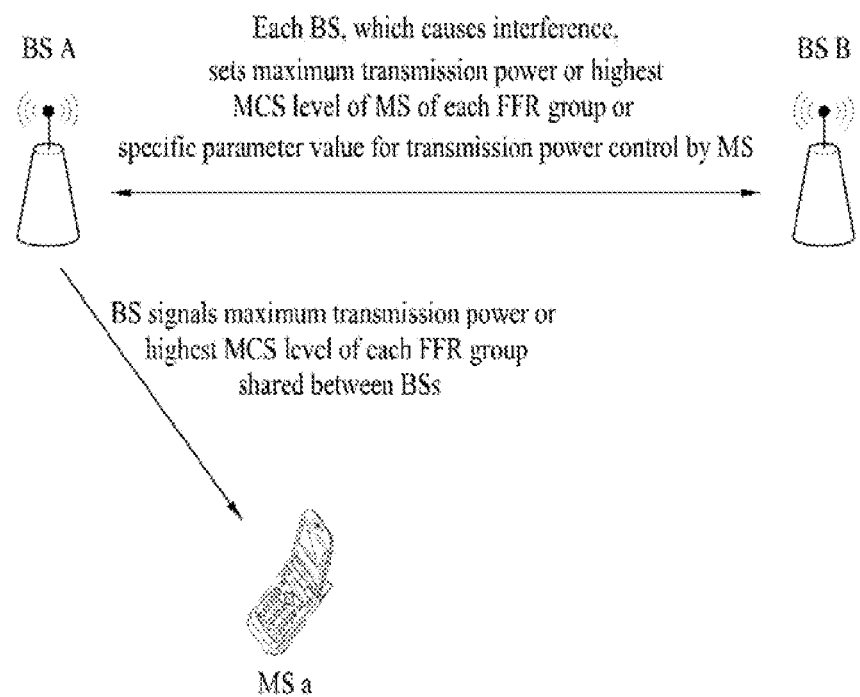
FIG. 6 illustrates an example operation scenario of a base station and a mobile station when a soft FFR scheme is applied in uplink.

FIG. 6 illustrates an example operation scenario of a BS and an MS when a soft FFR scheme is applied in uplink.

Referring to FIG. 6, the BS may set a maximum transmission power level of an MS or a highest Modulation and Coding Schemes (MCS) level, a specific parameter value used when the MS controls transmission power, for each FFR group (or partition). One BS may signal information of the maximum transmission power level of the MS or the specific parameter value or highest MCS level for transmission power control of the MS set for each FFR group to another BS using the backbone network. BSs may share the information of the maximum transmission power level of the MS or the specific parameter value or highest MCS level for control of transmission power of the MS set for each FFR group.

Each BS may signal, to the MS, the set information of the maximum transmission power level of the MS or the specific parameter value or highest MCS level for control of transmission power of the MS. Such set information may be periodically broadcast in units of a superframe or multiple superframes to each MS. Such information may also be signaled to the MS in an ABI or message type. The information signaled to the MS may be used for uplink power control.

Figure 7:
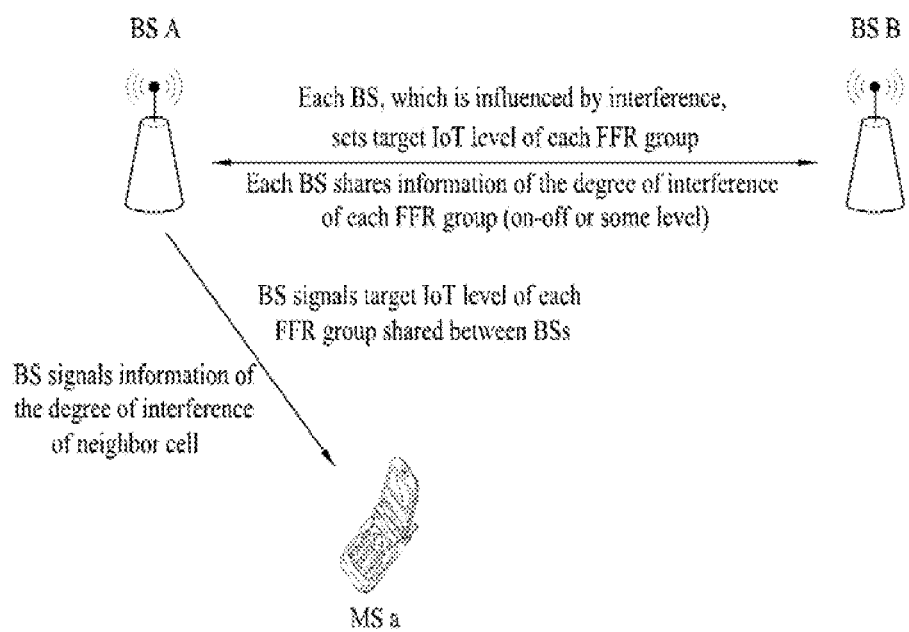
FIG. 7 illustrates an example operation scenario of a base station and a mobile station when a soft FFR scheme is applied in uplink.

FIG. 7 illustrates an example operation scenario of a BS and an MS when a soft FFR scheme is applied in uplink.

Referring to FIG. 7, a BS, which is influenced by interference in uplink, may set a target IoT level (or IoT control parameter) for each FFR group (or partition). Here, the IoT level is a value indicating the degree of interference between cells. One BS may signal information of the target IoT level set for each FFR partition to another BS using a backbone network. BSs may share the information of the degree of interference for each FFR partition. Each BS may signal the information of the degree of interference for each FFR partition and the information of the target IoT level for each FFR partition shared between BSs to the MS.

The signaled information of the degree of interference for each FFR partition and the signaled information of the target IoT level for each FFR partition may be used for Open Loop Power Control (OLPC) or may be implicitly used for Closed Loop Power Control (CLPC). Each BS may periodically broadcast the target IoT level information to the MS in units of a superframe or multiple superframes, which are defined in the IEEE 802.16m system, to each MS. The BS may also transmit the target IoT level information to the MS in an ABI or message format.

Figure 8:
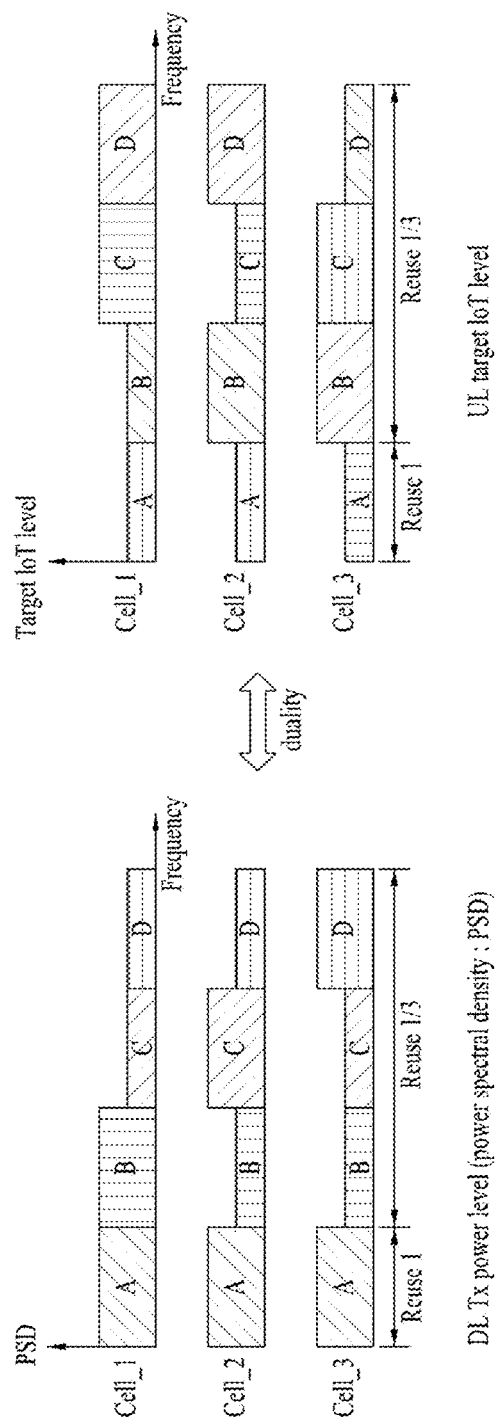
FIG. 8 illustrates duality of a downlink transmission power level and an uplink target IoT level.

FIG. 8 illustrates duality of a downlink transmission power level and an uplink target IoT level.

In downlink, a BS, which causes interference, may signal a transmission power level to an MS after negotiation between BSs. In this Case, the MS may be influenced by interference. However, in uplink, since the MS causes interference, the BS, which is influenced by interference, may signal a target IoT level to the MS after negotiation between BSs. As shown in FIG. 8, the uplink target IoT level is low in a frequency reuse region with a high downlink transmission power level and is high in a frequency reuse region with a low downlink transmission power level. Thus, it can be considered that the downlink transmission power level and the uplink target IoT level are in a dual relation.

In the above operation scenario, all cells may have the same FFR configuration information. The FFR configuration information may include the number of FFR groups and the respective bandwidths of the groups. In the IEEE 802.16m system, the BS may transmit an FFR configuration information to the MS through a broadcast channel in units of a superframe or multiple superframes. The BS may also transmit a target IoT level of each FFR group as a part of the FFR configuration to the MS. In uplink power control, the target IoT level may be replaced with interference information of each FFR group. The MS may use the target IoT level information received from the BS for power control. Here, information of the degree of interference of each FFR group may be shared between BSs and may be signaled to the MS to be used for open-loop power control or may be implicitly used for open-loop power control.

The MS may additionally use information of geometry with respect to a neighbor BS for power control. That is, when performing power control, the MS may use both the FFR group and IoT level control in the following manner. The MS may perform power control using the target IoT level of each FFR group, the degree of interference of each FFR group, and information of pathloss to a neighbor BS (i.e., P_MS=P_intra–f(the target IoT level of each FFR group, the degree of interference of each FFR group, and pathloss to neighbor BS)). Alternatively, the MS may perform power control using the target IoT level of each FFR group, the degree of interference of each FFR group, pathloss to a neighbor BS, and pathloss to the serving BS (i.e., P_MS=f(the target IoT level of each FFR group, the degree of interference of each FFR group, pathloss to neighbor BS, and pathloss to serving BS)). Here, P_MS denotes power of the MS and P_intra denotes power adjusted by power control in the same cell.

It is preferable that inter-cell interference be taken into consideration when the MS controls uplink power. In order to provide Interference plus Noise Ratio (SINR) or a Carrier to Interference plus Noise Ratio (CINR) required for receiving a signal and data without errors at the receiver side, the transmitter may determine transmission power taking into consideration pathloss, noise and interference, and a target SINR or CINR desired by the receiver side. Here, transmission power can be represented by $P_{tx}=SINR_t+(N+I)+PL$.

The transmission power set in this manner may be calculated as $P_{tx}=\min\{P_{max}, SINR_t+(N+I)+PL_s+\text{offset}\}$, taking into consideration an offset value and a maximum transmission power dependent on system characteristics. However, in this power control method in multi-cell (sector) environments, $P_{max}$ that is commonly applied to all transmitters, an offset value, pathloss (PL), and noise (N) and interference (I) that have been set without taking into consideration Inter-Cell Interference may cause or increase ICI to a neighbor cell. This not only may cause a deterioration of system performance but may also cause restriction of system coverage and the capacity. A power control method, in which PL items to be compensated are controlled taking into consideration ICI, (for example, $P_{tx}=SINR_t+(N+I)+\text{scale\_factor}(PL_s)$) has a problem in that a tradeoff occurs between cell (sector)-edge user performance and center user performance. Accordingly, there is a need to provide a new power control method to overcome such problems.

In multi-cell (sector) environments, transmission power of one cell or sector may operate as interference power for a receiver of another cell (sector). Inter-cell interference may be effectively controlled by applying a factor such as IoT, in which inter-cell interference is reflected, when transmission power is set. Inter-cell interference may be controlled by comparing a value of inter-cell interference that is caused to a neighbor cell by transmission power with a specific value or a threshold value and then increasing or decreasing transmission power based on the comparison.

It is preferable that, if the level of interference or the level of IoT to a neighbor cell estimated using transmission power calculated through power control of the same cell or transmission power calculated without using the factor, in which inter-cell interference is reflected, is higher than the threshold value, transmission power be increased so that the level of interference or the level of IoT caused to the neighbor cell does not exceed the threshold value. Alternatively, link quality may be improved by increasing, if the level of interference or the level of IoT is less than the threshold value, transmission power within a range in which the level of interference or the level of IoT does not exceed the threshold value. Here, transmission power may also be used directly without increasing the transmission power.

The threshold of the interference level or IoT level, which the BS uses to determine transmission power, may be set to one value for all frequency bands. The threshold may also be set for each frequency band, each frequency partition, or each frequency band allocated to the MS. The BS may use a predefined value according to system characteristics as the threshold and may also adaptively set the threshold using a value exchanged between cells through a wireless channel or the backbone network.

When the threshold of the IoT level is exchanged between neighbor cells, this value may or may not be quantized. An index or indicator, which indicates the predefined value, may also be used. A power control method that uses the factor such as the IoT value in which inter-cell interference is reflected may control transmission power by increasing or decreasing transmission power calculated by power control in the same cell (i.e., intra-cell power control, without taking into consideration inter-cell interference). Alternatively, transmission power may be controlled by increasing or decreasing transmission power calculated using the factor such as the IoT value, in which inter-cell interference is reflected, according to power control in the same cell.

The following is an example of a method for controlling uplink power.

Inter-cell interference can be reduced by applying an open-loop scheme or a closed-loop scheme to uplink transmission power control in the following manner using an IoT value in which the degree of inter-cell interference is reflected.

First, initial (intra-cell) transmission power can be calculated. The following Mathematical Expression 32 is an equation for calculating the initial transmission power.

$$P_{tx} = \min\{P_{max}, \text{SINR}_t + (N+I) + F \cdot PL_s\}(dB) \quad \text{[Mathematical Expression 32]}$$

Here, $P_{tx}$ denotes transmission power, $P_{max}$ denotes maximum transmission power, $\text{SINR}_t$ denotes a target SINR, N denotes thermal noise, I denotes interference, F denotes a scaling factor, and $PL_s$ denotes pathloss between an MS and a serving BS.

Thereafter, an IoT value of a neighbor cell can be estimated. The estimated neighbor cell IoT value can be represented by the following equation.

$$P_{ici} = P_{tx} - PL_{i,BS} \text{ (dB)}, \quad \text{[Mathematical Expression 34]}$$
$$IoT_{est} = \frac{(N + P_{ici})}{N}$$

Here, $P_{ici}$ denotes inter-cell interference power, $P_{tx}$ denotes transmission power, $PL_{i,BS}$ denotes pathloss between an MS and an interference cell BS, and $IoT_{est}$ denotes an estimated IoT value.

Thereafter, transmission power can be controlled by comparing the estimated IoT value and the threshold IoT value. Transmission power can be adjusted if the estimated IoT value is greater than the threshold IoT value. In the case where the IoT value applied to a neighbor cell due to transmission power is greater than the threshold IoT value, transmission power can be adjusted so that the IoT value does not exceed the threshold IoT value. That is, transmission power can be adjusted as represented by $P_{tx} = (IoT_{thr} \times N) - N + PL_{i,BS}$. On the other hand, in the case where the IoT value applied to a neighbor cell due to transmission power is less than the threshold IoT value, a value calculated through power control in the same cell (i.e., intra-cell power control) can be used as uplink transmission power.

In addition, if the newly calculated transmission power value is less than a transmission power value required in a predefined MCS level in the case where the estimated IoT value is greater than the threshold IoT value, the BS or MS may apply modulation and coding to the MCS level corresponding to the newly calculated transmission power. Accordingly, it is possible to improve link reliability and to reduce interference in the same cell. It is possible to signal the reduced transmission power or MCS level or a corresponding factor to the BS or MS so that the BS or MS can recognize it.

Also, in the case where the estimated IoT value is less than the threshold IoT value, a transmission power value calculated through power control in the same cell is allowed to be increased so as to achieve an MCS level higher than the set MCS level within a range in which the IoT value does not exceed the threshold IoT value, the BS or MS can apply modulation and coding to the MCS level corresponding to the increased transmission power. Here, it is possible to signal the increased transmission power or MCS level or a corresponding factor to the BS or MS so that the BS or MS can recognize it.

Referring to the determination of the threshold IoT value, in power control using the IoT value, the threshold IoT value may be set to one value or multiple values according to a frequency partition. In the case of a system using an FFR scheme, when scheduling is performed such that a cell-edge user or a center user of another cell uses the same frequency partition (a partition of frequency reuse factor 1/N) or that a center user of one cell or a center user of another cell uses the same frequency partition (a partition of frequency reuse factor 1), the threshold IoT value of the cell-edge user may be set to be higher than that of the cell center user in the band partition of frequency reuse factor 1/N.

The threshold IoT value of the cell center user may be set to be lower than that of the cell-edge user. On the other hand, the threshold IoT values applied to the cell-edge user and the center user may be set to be equal according to system characteristics and conditions. The threshold IoT values set in this manner may be adaptively changed through broadcasting or signaling between BSs according to system environments.

The BS measures an IoT value upon receiving a NACK signal indicating that the channel condition is bad from the MS. When the BS has received a NACK signal more than a predefined number of times, the BS may notify a neighbor BS of an IoT value upon receiving the NACK signal. The notified IoT value may include the average, minimum, maximum, or specific IoT value of the NACK status. When the BS has received a threshold IoT value from a neighbor BS, the BS may set the threshold IoT value to the average, minimum, or maximum of the received IoT value or may set the threshold IoT value according to a predefined method.

Initial calibration and periodic adjustment of transmission power may support uplink power control without data loss. The uplink power control algorithm may determine the transmission power of an OFDM symbol in order to compensate for pathloss, shadowing and fast fading. Such uplink power control is designed to control the inter-cell interference level.

A transmitting MS maintains the same transmission power density unless the maximum power level is reached. That is, when the number of active Logical Resource Units (LRUs) allocated to a user is reduced, the total transmission power may be reduced by the MS in proportion to the number of active LRUs without additional power control messages. However, the transmission power level does not exceed the maximum level indicated by signal integrity considerations and regulatory requirements. The MS may interpret a transmission power control message which indicates a required change of the transmission power density. In interference level control, the current IoT level of each cell may be shared among BSs. In addition, a parameter for controlling inter-cell interference may be determined by coordination between BSs.

Figure 9:
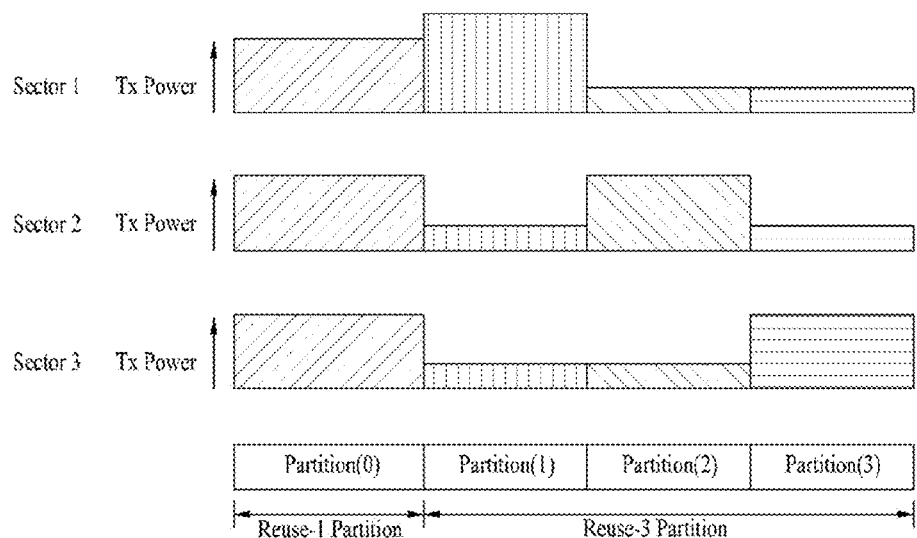
FIG. 9 illustrates an example wherein a different transmission power value is used for each frequency partition in the case where an uplink FFR scheme is applied.

FIG. 9 illustrates an example wherein a different transmission power value is used for each frequency partition in the case where an uplink FFR scheme is applied.

Referring to FIG. 9, a system which uses an uplink FFR scheme may have a different uplink IoT control parameter ($\gamma_{IoT}$) for each frequency partition. In the case of the uplink FFR scheme, the BS may measure amount of the interference for each frequency partition and may transmit required information such as the measured interference information for each frequency partition to the MS or to another BS. An uplink FFR configuration includes information of the size of each frequency partition and the number of frequency partitions broadcast through a secondary superframe header (S-SFH). The following Table 4 illustrates an S-SFH SP2 IE associated with the uplink FFR scheme.

TABLE 4

| Syntax | Size (bit) | Notes |
|---|---|---|
| S-SFH SP2 IE format ( ) { | | |
|     Duplexing mode | 1 | |
|     Sub-frame configuration (DL/UL ratio. duplexing mode) | 6 | |
|     If (Duplexing mode == FDD) { | | |
|         UL carrier frequency | [12] | (Need more discussion) |
|         UL bandwidth | [3] | (Need more discussion) |
|     } | | |
|     MSB bytes of BSID | 24 | Specifies the Operator ID |
|     FFR partitioning info for DL region | [11] | DL_SAC(4). DL_FPSC(3). DL_FPC(4) (Up to 11 bits. Need the decision from DL physical structure section) |
|     FFR partitioning info for UL region | [11] | UL_SAC(4). UL_FPSC(3). UL_FPC(4) (up to 11 bits. Need the decision from UL physical structure section) |
|     Initial ranging codes | 6 | 64 RNG codes (Need the decision from UL Ctrl section) |
|     Initial ranging backoff start | 4 | Initial backoff window size for initial ranging contention. expressed as a power of 2. Values of n range 0-15 (Need the decision from UL Ctrl or MAC operation section) |
|     Bandwidth request backoff start | 4 | Initial backoff window size for contention BRs. expressed as a power of 2. Values of n range 0-15 (the highest order bits shall be unused and set to 0) (Need the decision from UL Ctrl or MAC operation section) |
|     Bandwidth request backoff end | 4 | Final backoff window size for contention BRs. expressed as a power of 2. Values of n range 0-15 (Need the decision from UL Ctrl or MAC operation section) |
|     NSP ID | 24 | Network service provider ID |
|     Additional broadcast information indicator (ABI) | TBD | |
|     MS Transmit Power Limitation Level | 8 | Unsigned 8-bit integer. Specifies the maximum allowed MS transmit power. Values indicate power levels in 1 dB steps starting from 0 dBm |
|     Minimum level of power offset adjustment | TBD | |
|     Maximum level of power offset adjustment | TBD | |
|     reserved | | |
| } | | |

The uplink Frequency Partition Configuration (UFPC) information is expressed as above table 4. Also, the BS may signal (or broadcast) an uplink IoT control parameter of each frequency partition to the MS. The following Table 5 illustrates an example of the format of signaling of the uplink IoT control parameter for each frequency partition.

TABLE 5

| Syntax | Size (bits) | Notes |
|---|---|---|
| IE format ( ) { | | |
|     Default UL IoT control parameter | 4 bits | The UL IoT control parameter is $\gamma_{IoT}$. When Uplink frequency Partition Count (UFPCT) = 1, this value may be applied to FP0. When UFPCT = 3, this value may be applied to a specific partition for each cell among frequency partitions of frequency reuse factor 3. When UFPCT = 4, this value is applied to FP0 and one of frequency partitions of FRF 3. |
|     Relative adjustment of IoT control parameter | 2 or 3 bits | This value is applied to frequency partitions other than a frequency partition that uses the default value alone. For example, when Uplink frequency Partition Count (UFPCT) = 4 and the designated frequency partition of FRF 3 is FP1, $\gamma_{IoT}$ for FP2 and FP3 is a default $\gamma_{IoT}$ applied to FP0 and FP1 minus a relative adjustment. |

TABLE 5-continued

| Syntax | Size (bits) | Notes |
|---|---|---|
| } | | Instead of the relative adjustment, an absolute value for frequency partitions other than a frequency partition that uses the default value alone may be signaled. |

Referring to Table 5, the BS may signal a default $\gamma_{IoT}$ value for each frequency partition and may additionally signal a relative adjustment value to the default $\gamma_{IoT}$ for a specific frequency partition.

First, a method for signaling a default uplink IoT control parameter will be described. Here, the uplink IoT control parameter may be represented by $\gamma_{IoT}$.

The default $\gamma_{IoT}$ may be equal or different for each frequency partition. For example, one 4-bit default $\gamma_{IoT}$ may be commonly applied to all partitions and 4 bits may also be individually allocated to each partition.

In addition, the BS may signal a relative adjustment value of the IoT control parameter for each frequency partition. This value is applied to frequency partitions other than a frequency partition which uses the default value alone. A specific partition among three partitions of frequency reuse factor 3 may be a partition which uses the default $\gamma_{IoT}$ alone. Here, the specific partition may be different for each cell (or sector). The specific partition may be determined in a cell-specific manner. For example, when the specific partition, which uses the default $\gamma_{IoT}$ alone, among three partitions of frequency reuse factor 3 is FP1 in cell 1, the specific partition may be FP2 in cell 2 and the specific partition may be FP3 in cell 3.

The partition that has been determined in a cell-specific manner among the three partitions of frequency reuse factor 3 may be signaled to the MS through an SFH, ABI, A-MAP, or message type or may be determined in a type such as a partition number (=mod (cell ID, 3)) that is determined in a cell-specific manner.

In the case where the number of frequency partitions is 4 in cell 1 and the specific partition among 3 frequency partitions of frequency reuse factor 3 is FP1, only the default $\gamma_{IoT}$ may be directly applied to FP0 and FP1 and a value obtained by subtracting the relative adjustment value from the default $\gamma_{IoT}$ may be applied to FP2 and FP3. Accordingly, as a simple signaling method, the BS may additionally signal the relative adjustment value for FP2 and FP3.

Alternatively, BS may signal an absolute value instead of the relative adjustment value for frequency partitions other than a frequency partition which uses the default value alone. For example, if the number of frequency partitions is 4, a default $\gamma_{IoT}$ value may be transmitted for a specific partition (for example, FP1) among partitions of frequency reuse factor 3 and the partition FP0 of frequency reuse factor 1 and a default $\gamma_{IoT}$ value may be transmitted for the remaining partitions FP2 and FP3 of frequency reuse factor 3. That is, a 4-bit default $\gamma_{IoT}$ value may be signaled for FP0 and FP1 and a 4-bit default $\gamma_{IoT}$ value may be signaled for FP2 and FP3.

Unlike the above signaling method in which a 4-bit $\gamma_{IoT}$ value is signaled for frequency partitions using the default value, a 2 or 3-bit may be additionally signaled in the case of the signaling method which uses the relative adjustment value.

As the above description, the uplink IoT control parameter for controlling the inter-cell interference level is expressed as $\gamma_{IoT}$, it may also be expressed as another symbol such as $\Delta_{IoT}$ or $\gamma$ etc.

The following is a description of power control equations for open-loop power control. A transmission power level for each stream for uplink physical channel transmission can be represented by a variety of optional equations as follows.

[Mathematical Expression 35]

$$P_{Tx} = \min(P_{Tx,1}, \text{Target } IoT - PL_i - 10 \log 10(MT_T)) \text{ [dBm]} \quad \text{(Option 1)}$$

where, $P_{Tx,1} = PL_s + NI + \text{SINR}_{Target} + \text{Offset}_{perAMS} + \text{Offset}_{perABS}$ [dBm].

[Mathematical Expression 36]

$$P_{Tx} = \min(P_{Tx,1}, \text{Target } IoT - PL_i) - 10 \log 10(MT_T) \text{ [dBm]} \quad \text{(Option 2)}$$

where, $P_{Tx,1} = PL_s + NI + \text{SINR}_{Target} + \text{Offset}_{perAMS} + \text{Offset}_{perABS}$ [dBm].

[Mathematical Expression 37]

$$P_{Tx\_Temp} = PL_s + NI + \text{SINR}_{Target} + \text{Offset}_{perAMS} + \text{Offset}_{perABS} \text{ [dBm]}$$

$$P_{Inter-cell} = PL_i + \text{target } IoT + \text{Offset}_{perAMS} + \text{Offset}_{perABS} \text{ [dBm]},$$

$$P_{Tx} = \begin{cases} P_{Tx\_Temp} - 10\log10(MT_T), & \text{if } (P_{Tx\_Temp} \leq P_{Inter-cell}) \\ P_{Inter-cell} - 10\log10(MT_T), & \text{if } (P_{Tx\_Temp} > P_{Inter-cell}) \end{cases} \quad \text{(Option 3)}$$

[Mathematical Expression 38]

$$P_{Tx} = \alpha \cdot PL + NI + \text{SINR}_{Target} + \text{Offset}_{perAMS} + \delta_{PowerScaling} + \text{ICI}_{Offset} \text{[dBm]} \quad \text{(Option 4)}$$

$$P_{tx\_temp} = \alpha \cdot PL + NI + \text{SINR}_{Target} + \text{Offset}_{perAMS} + \delta_{PowerScaling}.$$

$$ICI_{Offset} = \{0 \text{ if } P_{tx\_temp} < P_{Inset-cell}, P_{Inset-cell} - P_{tx\_temp} \text{ if else}\}$$

$$P_{Inter-cell} = \text{Target } IoT - PL_i \text{[dBm]}$$

[Mathematical Expression 39]

$$P_{Tx} = \min(PL + NI + \text{SINR}_{Target} + \text{Offset}_{perAMS} + \delta_{PowerScaling}, P_{Inter-cell}) \text{[dBm]} \quad \text{(Option 5)}$$

where, $$P_{Inter-cell} = \text{Target } IoT - PL_i \text{[dBm]}.$$

[Mathematical Expression 40]

$$P_{Tx}=\min(PL+NI+SINR_{Target}+\text{Offset}_{perAMS}+\text{Offset}_{perABS}+10\log 10(1/MT_T), P_{Inter-cell})[\text{dBm}] \quad \text{(Option 6)}$$

where, $P_{inter-cell}=\text{Target } IoT-PL_i[\text{dBm}]$.

[Mathematical Expression 41]

$$P_{Tx}=\min(PL+NI+SINR_{Target}+\text{Offset}_{perAMS}+\text{Offset}_{perABS}+10\log 10(MT_T)), P_{target\ IoT})[\text{dBm}] \quad \text{(Option 7)}$$

where, $P_{target\ IoT}=\text{Target } IoT-PL_i[\text{dBm}]$.

[Mathematical Expression 42]

$$P_{Tx\_Temp} = PL_s + NI + SINR_{Target} + \text{Offset}_{perAMS} + \text{Offset}_{perABS} \ [\text{dBm}],$$

$$P_{target\ IoT} = \text{Target } IoT - PL_i \ [\text{dBm}], \quad \text{(Option 8)}$$

$$P_{Tx} = \begin{cases} P_{Tx\_Temp} - 10\log10(MT_T), & \text{if } (P_{Tx\_Temp} \le P_{Target\_IoT}) \\ P_{Target\_IoT} - 10\log10(MT_T), & \text{if } (P_{Tx\_Temp} \le P_{Target\_IoT}) \end{cases}$$

In the above Mathematical Expressions 35 to 42, $P_{TX}$ denotes a transmission power level for each stream at a MS for obtaining a specific $SINR_{Target}$, $PL_s$ denotes pathloss for a serving cell estimated by the MS, $PL_i$ denotes pathloss for a cell with the strongest interference estimated by the MS, and NI denotes an average power level (dBm) of noise and interference of each subcarrier estimated by the serving cell. The NI level of each frequency partition may be broadcasted through control signaling such as an S-SFH or ABI. $SINR_{Target}$ denotes a target SINR for data and control channel transmission and $\text{Offset}_{perAMS}$ denotes a correction term for a specific-MS power offset. The BS may control $\text{Offset}_{perAMS}$ using a power control message through an A-MAP in the case where mode switching is performed between open-loop power control and closed-loop power control. $\text{Offset}_{perABS}$ denotes a transmission power level adjustment value that is controlled by the MS. $MT_T$ denotes the number of streams indicated by a UL A-MAP IE. In the case of single-user MIMO, this value is set to $M_t$ which is the number of streams per user. In the case where CSM, this value is set to $M_t\_A$ which is the total number of streams. This value may be set to "1" in the case of control channel transmission. TargetIoT may be broadcast to other sectors through an S-SFH. Here, the target IoT level may be different for each frequency partition.

In Options 1 to 7 of the above Mathematical Expressions 35 to 42, a α value may be taken into consideration when compensating for a pathloss component for a serving cell or a non-serving cell as in Option 3. When the α value is applied to the equations of Option 3, it may be used in a cell-common manner or in a user-specific manner. In a system which employs frequency partitions, a different α value may be applied to each frequency partition. $P_{inter-cell}$ and $P_{targetIoT}$ have the same meaning in the above equations. $\delta_{PowerScaling}$ has the same meaning as (10 log 10($MT_T$)) and thus has the same value as (10 log 10($MT_T$)).

The BS may signal an NI level to the MS through an S-SFH. Here, the information that the BS signals to the MS may include an average NI level [dBm] of subcarriers used when frequency partitions are not taken into consideration and an additional NI level of a sounding channel (NI_level_sounding_ch) [dBm]. On the other hand, in the case of a method in which frequency partitions are applied among the NI level signaling methods, an NI level for each frequency partition and an NI level of each sounding channel (NI_level_sounding_ch) [dBm] may be signaled.

Figure 10:
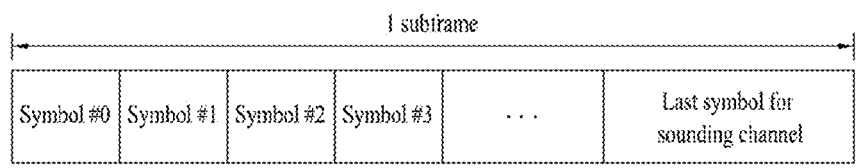
FIG. 10 illustrates an example wherein a sounding channel configuration is transmitted in one OFDM symbol at intervals of a predetermined frame period.

FIG. 10 illustrates an example wherein a sounding channel configuration is transmitted in one OFDM symbol in certain frame period.

Referring to FIG. 10, a time/frequency region for transmission of sounding information in one symbol needs to be discriminated, in terms of channel characteristics, from a time/frequency region for transmission of other data. Although FIG. 10 illustrates that the last symbol is used as a sounding channel, location of symbol used as the sounding channel is not limited to last symbol. In addition, more than one symbol may be used as the sounding channel.

The legacy power control mechanism has been based on single user transmission of each allocated resource unit. In order to extend the uplink power control operation so as to support multiple users, there is a need to control transmission power such that the interference level when multi-user transmission is used is maintained at the level of single user transmission. The following Table 6 illustrates comparison of SIMO, CSM with consideration of the number of streams, and CSM without consideration thereof in terms of system throughput, cell edge-user throughput, and IoT level.

TABLE 6

| | | SIMO | CSM without consideration of the number of streams | CSM with consideration of the number of streams |
|---|---|---|---|---|
| System throughput | | 2.5752 Mbps | 2.24 Mbps | 2.9231 Mbps |
| | | (0.70 bps/Hz) | (0.602 bps/Hz) | (0.79 bps/Hz) |
| 5%-tile user throughput | | 57.79 kbps | 51.71 kbps | 64.43 kbps |
| (spectral efficiency) | | (0.0156 bps/Hz) | (0.0140 bps/Hz) | (0.0174 bps/Hz) |
| IoT | Mean | 5.959 | 6.3417 | 5.9195 |
| level | Std. | 0.6836 | 0.7505 | 0.5401 |

In the power control method suggested in the above Mathematical Expression 35, power adjustment is performed taking into consideration a target IoT such that transmission power does not exceed a power level at which the target IoT to other cells is achieved.

The following Table 7 illustrates uplink system-level simulation assumptions for the results illustrated in the above Table 6.

TABLE 7

| Topic | Baseline System Assumptions |
|---|---|
| Basic modulation | QPSK, 16QAM |
| Duplexing scheme | TDD |
| Subchannelization | PUSC |
| Resource Allocation Granularity | PUSC: 1 slot (1 slot = 1 subchannel x 3 OFDMA symbols) |
| Downlink pilot structure | Specific to Subchannelization scheme PUSC |
| Multi-antenna Transmission format | SIMO (1x2) CSM |
| Receiver Structure | MRC for SIMO, MMSE for CSM |
| Data Channel coding | Convolutional Turbo Coding (CTC) |
| Control Channel Coding | CDMA Codes (PUSC 2 symbols) for Initial Ranging and Handover, CDMA Codes (PUSC 1 symbol) for Periodic Ranging and Bandwidth Request, CQICH (6 bits) |
| Scheduling | Proportional Fairness for full buffer data only |
| Link adaptation | QPSK(1/2) with repetition 1/2/4/6, QPSK(3/4), 16QAM(1/2), 16QAM(3/4) |
| Link to System Mapping | MMIB |
| H-ARQ | Chase Combining Synchronous, Nonadaptive, 1 frame ACK/NACK delay, Maximum 4 HARQ Retransmissions, initial target PER of 20% |
| Power Control | Simulation scenario specific |
| Interference Model | Frequency selective interference model for PUSC/AMC, no interference awareness at receiver |
| Frequency Reuse | 3 Sectors with Frequency Reuse Factor of 1 |
| Control Signaling | Initial Ranging, Periodic Ranging, Handover Ranging, Bandwidth Request, Fast Feedback/CQI Channel, Sounding |

The following Table 8 illustrates comparison of power control schemes with and without consideration of target IoT.

TABLE 8

| | Without power adjustment | With power adjustment in consideration of target IoT |
|---|---|---|
| Average user throughput (spectral efficiency) | 311.40 kbps (0.830 bps/Hz) | 324.85 kbps (4.3%↑) (0.866 bps/Hz) |
| 5%-tile user throughput (spectral efficiency) | 46.84 kbps (0.012 bps/Hz) | 73.58 kbps (57%↑) (0.020 bps/Hz) |

It can be seen from Table 8 that both the average user throughput and the cell-edge user throughput are improved when power adjustment is performed in consideration of the target IoT.

The following Table 9 illustrates a test scenario for the results illustrated in the above Table 8.

TABLE 9

| Scenario/Parameters | Baseline Configuration (Calibration & SRD) | Urban Macrocell |
|---|---|---|
| Requirements | Mandatory | Mandatory |
| Site-to-Site distance | 1.5 km | 0.5 km<br>1.5 km |
| Carrier Frequency | 2.5 GHz | 2.5 GHz |
| Operating Bandwidth | 10 MHz for TDD | 10 MHz for TDD |
| BS Height | 32 m | 32 m |
| MS Tx Power | 23 dBm | 23 dBm |
| MS Height | 1.5 m | 1.5 m |
| Penetration Loss | 10 dB | 10 dB |
| Pathloss Model | Loss (dB) = 130.62 + 37.6$\log_{10}$(R) (R in km) | Loss (dB) = 35.2 + 35$\log_{10}$(R) + 26$\log_{10}$(f/[GHz]/2) (R in m) |
| Lognormal Shadowing Standard Deviation | 8 dB | 8 dB |
| Correlation distance for shadowing | 50 m | TBD [50 m] |
| Mobility | 0-120 km/hr | 0-120 kmph |
| Channel Mix | ITU Ped B * 3 km/hr - 60%<br>ITU Veh A 30 km/hr - 30%<br>ITU Veh A 120 km/hr - 10% | Mix or specific |
| Spatial Channel Model | ITU with spatial correlation<br>a) Uncorrelated<br>b) Correlated<br>(BS Correlation Coefficient = 0.5) | |

The following Table 10 illustrates simulation assumptions for the results illustrated in the above Table 8.

TABLE 10

| Parameters | Baseline Configuration |
|---|---|
| Site-to-Site Distance | 1.5 km |
| Carrier Frequency | 2.5 GHz |
| Operating Bandwidth | 10 MHz for TDD |
| BS Height | 32 m |
| MS Tx Power | 23 dBm |
| MS Height | 1.5 m |
| Penetration Loss | 10 dB |
| Pathloss model | Loss(dB) = 130.62 + 37.6log$_{10}$(R) (R in km) |
| Lognormal Shadowing Standard Deviation | 8 dB |
| Correlation Distance for Shadowing | 50 m |
| Channel Type | ITU Ped B |
| Mobility | 3 km/hr |
| Spatial Channel Model | ITU with spatial correlation |
| Basic Modulation | QPSK, 16QAM |
| Duplexing Scheme | TDD |
| Subchannelization | CRU Allocation |
| Multi-antenna Transmission Format | 1x2 SIMO |
| Receiver Structure | MMSE |
| Data Channel Coding | Convolutional Turbo Coding (CTC) |
| Scheduling | Proportional Fairness (PF) for full buffer data only 10 active users/sector Fixed control overhead of 3 symbols, 15 symbols for data, 4 partitions of 48 sub-channels |
| Link Adaptation | 7 levels, QPSK(1/2) with repetition 1/2/3/4, QPSK(3/4), 16QAM(1/2), 16QAM(3/4) |
| Link to System Mapping | MMIB |
| HARQ | Adaptive HARQ, Up to 4 retransmissions, retransmission at intervals of 3 frames |
| Interference Model | Average interference in used band |
| Frequency Reuse Factor(FRF) | 3 sectors with FRF = 1, FRF 1/3 for FFR operation |
| Users dropped | Uniformly in entire cell |

The following Mathematical Expression 43 may be used as an equation for uplink open-loop power control.

$$P(dBm) = L + SINR_{Target} + NI + OffsetAMS_{perAMS} + OffsetABS_{perAMS}$$ [Mathematical Expression 43]

Here, $SINR_{Target}$ is the target uplink SINR received from the BS. A mode used to calculate this value is signaled through a power control message. P is the transmission power level (dBm) per stream and per subcarrier for the current transmission. L is an estimated average current UL propagation loss. This value includes a transmission antenna gain and pathloss of the MS. NI is an estimated average power level (dBm) of noise and interference per subcarrier at the BS and does not include the BS's receive antenna gain. $OffsetAMS_{perAMS}$ is a correction term for an MS-specific power offset. This value is controlled by the MS and its initial value is zero. $OffsetABS_{perAMS}$ is a correction term for an MS-specific power offset. This value is controlled by the BS through a power control message.

The estimated average current UL propagation loss L is calculated based on the total power received in active subcarriers of the frame preamble. When the user connects to a network, it is possible to perform negotiation on the parameters using the following Mathematical Expression 44.

[Mathematical Expression 44]

$$SINR_{Target} = \begin{cases} 10\log10\left(\max\left(10^{\wedge}\left(\frac{SINR_{MIN}(dB)}{10}\right), \gamma_{IoT} \times SINR_{DL} - \alpha\right)\right) -, & OLPC\ Mode\ 1 \\ \beta \times 10\log10(TNS) \\ C/N - 10\log10(R), & OLPC\ Mode\ 2 \end{cases}$$

where, C/N is a normalized C/N of the modulation/FEC rate of the current transmission. R is the number of repetitions for the modulation/FEC rate. The OLPC mode 1 is a target SINR value for IoT control and tradeoff between the overall system throughput and the cell edge performance and is determined by the control parameter $\gamma_{IoT}$ and $SINR_{MIN}$. Each parameter used in the OLPC mode 1 is described as follows.

$SINR_{MIN}$ is the minimum SINR rate required by a BS and is set by a unicast power control message. $SINR_{MIN}$ is represented in 4 bits. This value may be, for example, one of $\{-\infty, -3, -2.5, -2, -1.5, -1, 0, 0.5, 1, 1.5, 2, 2.5, 3, 3.5, 4, 4.5\}$. $\gamma_{IoT}$ is a fairness and IoT control factor, which is broadcast by the BS. $\gamma_{IoT}$ has 4 bits, the value of which may be, for example, one of $\{0, 0.1, 0.2, 0.3, 0.4, 0.5, 0.6, 0.7, 0.8, 0.9, 1.0, 1.1, 1.2, 1.3, 1.4, 1.5\}$. The $\gamma_{IoT}$ value may be different for each frequency partition.

$SINR_{DL}$ is the ratio of downlink signal power to noise plus interference power, which may be measured by the MS. $\alpha$ is a factor according to the number of receive antennas at the BS. This value is signaled through 3-bit MAC power control mode signaling and can be represented by one of $\{1, \frac{1}{2}, \frac{1}{4}, \frac{1}{8}, \frac{1}{16}, 0\}$. $\beta$ may be set to be zero or one through 1-bit MAC power control mode signaling. TNS is the total number of streams in a Logical Resource Unit (LRU) indicated by a UL A-MAP IE. In case of SU-MIMO, this value is set to $M_t$ which is the number of streams per user. In case of CSM, this value is set to TNS which is the total number of streams. In case of control channel transmission, this value may be set to 1.

Uplink power control includes not only open-loop power control described above but also closed-loop power control. In closed-loop power control, MS transmission power is adjusted through a power control A-MAP from the BS to compensate for channel changes. In order to maintain a specific power density at the BS at a modulation/FEC rate used by each MS, the BS may change not only the modulation and FEC rate allocated to the MS but also transmission power of the MS using a power control A-MAP.

Power control algorithm parameters may be optimized on a system-wide basis by the BS, may be broadcast periodically, and may be signaled by event triggering. The MS may transmit necessary information such as power headroom through a MAC message to the BS to support uplink power control. The BS may exchange necessary information with neighbor BSs through the backbone network to support uplink power control. Uplink power control for calculating the power of each stream is performed taking into consideration the number of streams multiplexed in the same allocated resource.

The transmission power level per stream for uplink physical channels of closed-loop power control may be represented by the following options.

[Mathematical Expression 45]

$$P_{Tx} = P_{last} + \Delta_{SINR} + \Delta_{PowerAdjust} - 10\log10(MT_T) \text{ [dBm]} \quad \text{(Option 1)}$$

[Mathematical Expression 46]

$$P_{Tx\_Temp} = P_{last} + \Delta_{SINR} + \Delta_{PowerAdjust} \text{ [dBm]}, \quad \text{(Option 2)}$$

$$P_{Tx} = \begin{cases} P_{Tx\_Temp} - 10\log10(MT_T), & \text{if } (P_{Tx\_Temp} \leq P_{Inter-cell}) \\ P_{Inter-cell} - 10\log10(MT_T), & \text{if } (P_{Tx\_Temp} > P_{Inter-cell}) \end{cases}$$

In Mathematical Expressions 45 and 46, $P_{Tx}$ denotes a transmission power level per stream of an MS, $P_{last}$ denotes the latest transmitted maximum power level among different uplink physical channels transmitted at the same time, $\Delta_{SINR}$ denotes the difference between the desired SINRs of previous and new MCS levels for an uplink physical channel. $\Delta_{PowerAdjust}$ denotes a power difference transmitted by the corresponding BS through a power control A-MAP. $MT_T$ has the same meaning as that of the above Mathematical Expressions 35 to 42.

Figure 11:
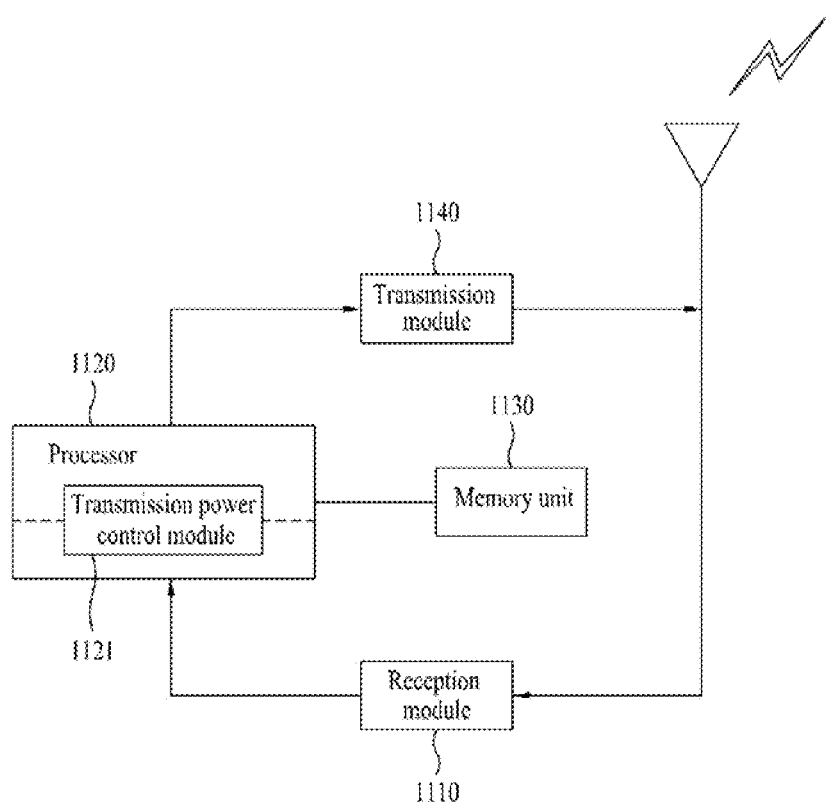
FIG. 11 is a block diagram illustrating a configuration of a preferred embodiment of a mobile station that can transmit signals according to the present invention.

FIG. 11 is a block diagram illustrating a configuration of a preferred embodiment of an MS that can transmit signals according to the present invention.

Referring to FIG. 11, the MS may include a reception module 1110, a processor 1120, a memory unit 1130, and a transmission module 1140.

The reception module 1110 can receive all downlink signals transmitted from a BS. For example, the reception module 1110 can receive a parameter (for example, an IoT control parameter) for controlling inter-cell interference of each frequency partition, information of a minimum signal to interference plus noise ratio (SINR) required by the BS, information of a Noise and Interference (NI) level measured by the BS, etc.

The processor 1120 may include a transmission power control module 1121. The transmission power control module 1121 can control a transmission power level for transmission from the MS using information of the level of interference between neighbor cells received through the reception module 1110. Here, each MS can determine a transmission power level for a frequency partition allocated to the MS. The MS can control a transmission power level using an inter-cell interference level control parameter received from the BS. In this case, transmission power level control may be performed periodically.

The memory unit 1130 can store information such as the inter-cell interference level information received from the BS and the transmission power level determined by the transmission power control module 1121 for a specific time and the memory unit 1130 can be replaced with another component such as a buffer (not shown).

The transmission module 1140 can transmit signals to the BS at the determined transmission power level.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

The signal transmission method for a wireless communication system according to the present invention can be used for industrial purposes.

The invention claimed is:

1. A method for transmitting a signal from a mobile station (MS) in a wireless communication system using a Fractional Frequency Reuse (FFR) scheme, the method comprising:
receiving first information including a frequency partition allocated to the MS;
receiving second information including a control parameter for controlling an inter-cell interference level for the allocated frequency partition;
receiving at least a minimum required signal to interference plus noise ratio (SINR), a factor value according to a number of receiving antennas, or a value indicating a media access control (MAC) power control mode; determining a target SINR using the second information and the following equation, $$SINR_{Target} = 10\log 10\left(\max\left(10^{\wedge}\left(\frac{SINR_{MIN}(\text{dB})}{10}\right), \gamma_{IoT} \times SINR_{DL} - \alpha\right)\right) - \beta \times 10\log 10(TNS)$$

where:
SINR$_{MIN}$ is the minimum required SINR;
γIoT is the control parameter for controlling the inter-cell interference level for the allocated frequency partition;
SIR$_{DL}$ is a downlink signal to interference power ratio;
α is the factor value according to the number of receiving antennas;
β is the value indicating the MAC power control mode; and
TNS is a total number of streams in a Logical Resource Unit (LRU) indicated by a UL A-MAP information element (IE);
determining an uplink transmission power level for the allocated frequency partition using the determined target SINR; and
transmitting a signal using the determined uplink transmission power level.

2. The method of claim 1, wherein a value of the received control parameter is different from a value of a control parameter of a different frequency partition in a cell-specific FFR pattern.

3. The method of claim 1, wherein the received control parameter is used for a cell-specific FFR pattern.

4. The method of claim 1, wherein the control parameter is received in 4 bits from a base station.

5. A mobile station (MS) configured to transmit a signal in a wireless communication system using a Fractional Frequency Reuse (FFR) scheme, the MS comprising:
a reception module configured to receive:
first information including a frequency partition allocated to the MS;
second information including a control parameter for controlling an inter-cell interference level for the allocated frequency partition; and
at least a minimum required signal to interference plus noise ratio (SINR), a factor value according to a number of receiving antennas, or a value indicating a media access control (MAC) power control mode;
a processor configured to:
determine a target SINR using the second information and the following equation, $$SINR_{Target} = 10\log 10\left(\max\left(10^{\wedge}\left(\frac{SINR_{MIN}(\text{dB})}{10}\right), \gamma_{IoT} \times SIR_{DL} - \alpha\right)\right) - \beta \times 10\log 10(TNS)$$

where:
SINR$_{MIN}$ is the minimum required SINR;
γIoT is the control parameter for controlling the inter-cell interference level for the allocated frequency partition;
SIR$_{DL}$ is a downlink signal to interference power ratio;
α is the factor value according to the number of receiving antennas;
β is the value indicating the MAC power control mode; and
TNS is a total number of streams in a Logical Resource Unit (LRU) indicated by a UL A-MAP information element (IE); and
determine an uplink transmission power level for the allocated frequency partition using the determined target SINR; and
a transmission module configured to transmit the signal using the determined uplink transmission power level.

6. The MS of claim 5, wherein a value of the received control parameter is different from a value of a control parameter of a different frequency partition in a cell-specific FFR pattern.

7. The MS of claim 5, wherein the received control parameter is used for a cell-specific FFR pattern.

8. The MS of claim 5, wherein the control parameter is received in 4 bits.

* * * * *